(12) United States Patent
Chao et al.

(10) Patent No.: US 8,090,612 B2
(45) Date of Patent: Jan. 3, 2012

(54) PRODUCING MARKETING ITEMS FOR A MARKETING CAMPAIGN

(75) Inventors: Hui Chao, San Jose, CA (US); Menaka Indrani, Fremont, CA (US); Gary Vondran, San Carlos, CA (US); Xiaofan Lin, Sunnyvale, CA (US); Parag M. Joshi, Los Gatos, CA (US); Dirk M. Beyer, Walnut Creek, CA (US); C. Brian Atkins, Mountain View, CA (US); Pere Obrador, Mountain View, CA (US); Alex Xin Zhang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1937 days.

(21) Appl. No.: 11/184,098

(22) Filed: Jul. 19, 2005

(65) Prior Publication Data

US 2007/0022003 A1    Jan. 25, 2007

(51) Int. Cl.
*G06Q 30/00* (2006.01)
(52) U.S. Cl. ..................................................... 705/7.29
(58) Field of Classification Search ................ 705/7, 10, 705/14
See application file for complete search history.

(56) References Cited

U.S. PATENT DOCUMENTS

| | | |
|---|---|---|
| 2002/0026359 A1 | 2/2002 | Long et al. |
| 2002/0169655 A1 | 11/2002 | Beyer et al. |
| 2002/0174182 A1 | 11/2002 | Wilkinson et al. |
| 2003/0050929 A1 * | 3/2003 | Bookman et al. .................. 707/7 |
| 2004/0103026 A1 | 5/2004 | White |
| 2004/0107127 A1 | 6/2004 | Kanzinger et al. |
| 2004/0122735 A1 * | 6/2004 | Meshkin .......................... 705/14 |
| 2004/0204975 A1 * | 10/2004 | Witting ............................. 705/7 |
| 2004/0267616 A1 | 12/2004 | Kargman |
| 2005/0038760 A1 | 2/2005 | Rasmussen |
| 2005/0086105 A1 | 4/2005 | McFadden et al. |
| 2005/0114209 A1 | 5/2005 | Mattingly et al. |

OTHER PUBLICATIONS

HP Digital Publishing Solutions, "The Marketing ROI Imperative: how digital publishing technologies boost marketing performance and productivity," (2003).

* cited by examiner

*Primary Examiner* — John Weiss
*Assistant Examiner* — Saba Dagnew

(57) ABSTRACT

Methods, machines, systems and machine-readable instructions for producing marketing items are described. In one aspect, a user is prompted to specify campaign parameters, including one or more campaign topics, defining a scope of the campaign. The user is prompted to specify for each of the one or more campaign topics a corresponding set of one or more attributes of intended recipients of the marketing campaign. The one or more specified campaign topics are associated to respective sets of targeted recipients selected from a database of records of potential recipients based on mappings of the respective sets of recipient attributes to the campaign topics and the specified campaign parameters defining the scope of the marketing campaign. For each of the targeted recipients, a respective marketing item containing a respective set of one or more contents matched to the campaign topic associated to the targeted recipient is composed.

40 Claims, 19 Drawing Sheets

PRODUCING MARKETING ITEMS FOR A MARKETING CAMPAIGN

BACKGROUND

A marketing campaign is a series of operations designed to attract customers to a product or service. Among the most common types of marketing operations are advertising and promotions. Advertising involves describing features and benefits of a product or service in a way that captures the attention of a target audience. Promotion involves keeping a product or service in the minds of a target audience in order to stimulate demand for the product or service. Advertising and promotions typically are carried out by carefully crafted materials, such as brochures, direct mail, flyers, written advertisements, and websites.

The goals of a marketing campaign depend on the overall business goals and strategies of the entity conducting the campaign. These goals typically are defined by specifying the target audience to be reached, the information to be conveyed to the target audience, how the information will be conveyed to the target audience, the monetary budget for the marketing campaign, the timeframe over which the marketing campaign should be conducted, and the desired results of the marketing campaign.

Clearly, one of the biggest challenges in producing a successful marketing campaign involves reaching or capturing the attention of the target audience. One of the most effective ways to reach a targeted audience is to design the marketing communications so that they are directly and personally relevant to the members of the targeted audience. This marketing approach commonly is referred to as "one-to-one marketing" or "loyalty marketing" or "customer relationship marketing". The level of personalization in the marketing communications may vary from a non-customized (or static) mass-produced document that will be received by every member of the target audience to a fully customized document that is personalized with information that is highly relevant and custom-tailored to each person in the target audience, including the layout, the copy (i.e., textual content), and the images appearing in the marketing material. The return on investment in the marketing campaign typically increases with the level of personalization of the marketing communications; unfortunately, the overall costs of producing the marketing campaign also increase with the level of personalization.

Marketing campaigns typically are expensive to produce, especially when high-end marketing communications are required. For example, a typical direct mail marketing campaign involves obtaining marketing lists of members of a target audience, creating direct mail materials, distributing direct mail materials to the target audience, recovering responses to the direct mail materials, and analyzing the results. These tasks are repeated for each new marketing campaign, even when a new marketing campaign involves simply adapting a centrally produced marketing communication to a local market. The marketing campaign tasks typically are distributed to many people, including people, such as outside marketing professionals and graphic designers, who work outside of the business entity conducting the marketing campaign. The process of communicating with and coordinating the activities of these different people imposes significant monetary and time costs on the business entity conducting the marketing campaign. Indeed, such costs often are prohibitive for small and medium sized companies.

What is needed is an integrated marketing campaign production approach that allows persons who are not experts in marketing or graphic design to produce high-quality marketing communications for a marketing campaign in a way that is less expensive and resource-intensive than current high-end marketing approaches.

SUMMARY

In one aspect, the invention features a machine-implemented method of producing marketing items for a marketing campaign. In accordance with this inventive method, a user is prompted to specify campaign parameters, including one or more campaign topics, defining a scope of the campaign. The user is prompted to specify for each of the one or more campaign topics a corresponding set of one or more attributes of intended recipients of the marketing campaign. The one or more specified campaign topics are associated to respective sets of targeted recipients selected from a database of records of potential recipients based on mappings of the respective sets of recipient attributes to the campaign topics and the specified campaign parameters defining the scope of the marketing campaign. For each of the targeted recipients, a respective marketing item is composed. Each of the composed marketing items contains a respective set of one or more contents matched to the campaign topic associated to the corresponding targeted recipient.

The invention also features a machine, a system and machine-readable instructions for implementing the above-described marketing item production method.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Introduction

The embodiments that are described in detail below provide an integrated marketing campaign production approach that allows persons who are not experts in marketing or graphic design to produce high-quality marketing communications for a marketing campaign in a way that is less expensive and resource-intensive than current high-end marketing approaches. These embodiments may be used by business entities seeking to produce high-end direct marketing communications for their own products or services and by third party service providers offering such production services to their client customers.

II. Overview

Figure 1:
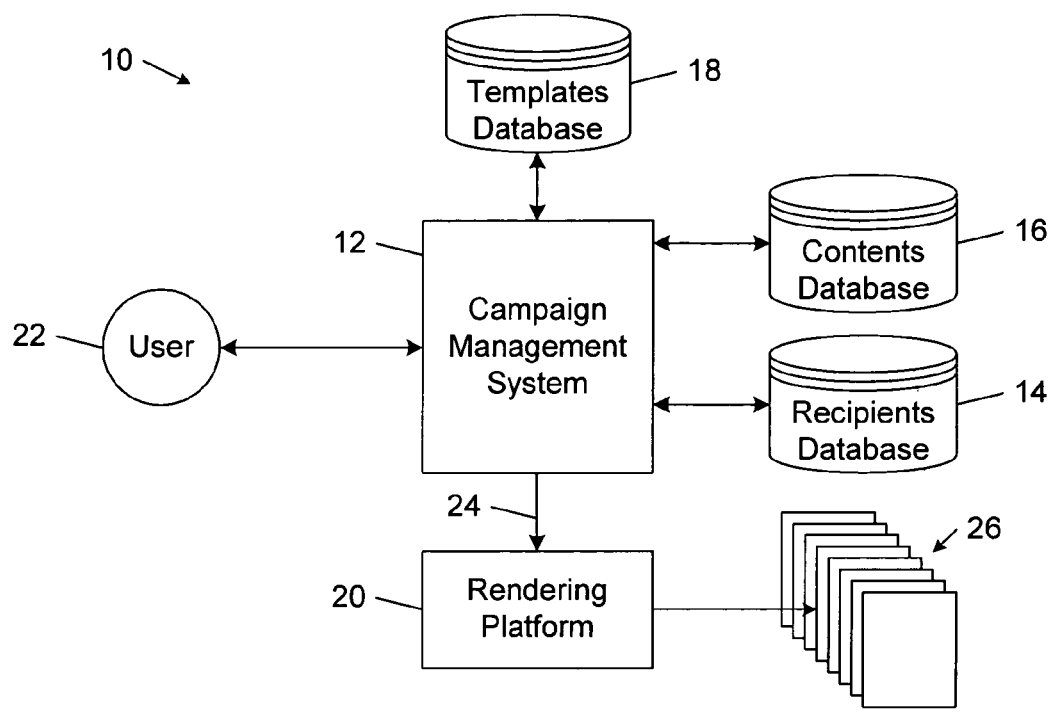
FIG. 1 is a block diagram of an embodiment of a marketing campaign production system.

FIG. 1 shows an embodiment of a marketing campaign production system that includes a campaign management system 12, a recipients database 14, a contents database 16, a templates database 18, and a rendering platform 20. The campaign management system 12 elicits from a user 22 inputs describing the user's marketing intentions. The campaign management system 12 translates the user's inputs into a set of output electronic specifications 24 of the marketing items for a marketing campaign based on the records in the recipients database 14, the contents database 16, and the templates database 18. In particular, the campaign management system 12 selects a set of targeted recipients from the recipient records in the recipients database 14, selects from the contents database 16 contents that are relevant to each of the targeted recipients, and integrates the selected contents into one or more variable data templates that are contained in the templates database 16. The campaign management system 12 transmits the output electronic specifications 24 to the rendering platform 20. The rendering platform 20 may be any type of rendering system, including a printing system (e.g., a printing press, such as the HP Indigo® digital printing press, or a desktop printer), an electronic mail generation system, and a website generation system. The rendering platform 20 converts the output electronic specifications 24 into rendered marketing items 26 that may be transmitted to the targeted recipients of the marketing campaign. The rendered marketing items 26 may be any form of physical or electronic marketing communication, including brochures, direct mail, electronic mail, flyers, written advertisements, and websites.

The recipients database 14 contains records of potential recipients of the rendered marketing items 26 that are produced by the marketing campaign production system 10. Each record consists of a set of attributes for a respective one of the potential recipients. Exemplary attributes include identifying attributes (e.g., identification number, first name, and last name), demographic attributes (e.g., age, gender, income level, residential address, ethnic background, marital status, parental status, and language preference), behavioral attributes (e.g., number of purchases from a company within a specific period of time, click through events to inks within a website, recency and frequency of visits to a store or website, and a measure of the monetary responsiveness to past marketing solicitations). The recipient records may be generated from existing information contained in customer databases, marketing databases, and information obtained through surveys and customer interactions through call centers and websites.

The contents database 16 is a repository that contains image content (e.g., bit map images, vector graphic images, and still photographs) and textual content or "copy" (e.g., headlines, captions, and blocks of text) that may be incorporated into the rendered marketing items 26 that are produced by the marketing campaign production system 10. Each of the contents is stored in the contents database 16 in the form of a separate file that may have a descriptive file name. In addition, each of the contents may be associated with meta data that relates to the subject matter of the contents. Exemplary types of meta data include descriptive terms or keywords, timestamp data corresponding to the creation data of the content file, and geographic data corresponding to the location where the content file was created. The meta data may be stored in headers (e.g., an EXIF header of an image file) of the content files or in a separate data structure, or both. A content management system may be used to organize and manage modifications of the images and copy that are contained in the contents repository.

The templates database 18 contains templates that describe predefined layout arrangements of fields in the marketing items that are capable of accepting variable content. In some embodiments, the size, shape and placement of the template fields are fixed. In other embodiments, the templates contain predefined content areas whose positions and sizes may be varied within specified ranges. For example, the content areas may be defined by variables with respective value domains that define the size, position, and content type of the content areas. Some embodiments of the campaign management system 12 automatically capture and express the graphic appearance of an existing base marketing item in a template that preserves the graphic appearance ("look and feel") in derivative documents that contain different content. In particular, these embodiments automatically determine layout relationships among explicit logical blocks that are extracted from the base marketing item. Based on these relationships, these embodiments automatically generate rules constraining layout variations among implicit logical blocks to approximate the base marketing item in appearance while accommodating variable content. In variable data printing applications, these embodiments may be used to create personalized direct mail pieces that contain unique information that is customized for each recipient while maintaining the same look and feel across all of the mail pieces.

Figure 2:
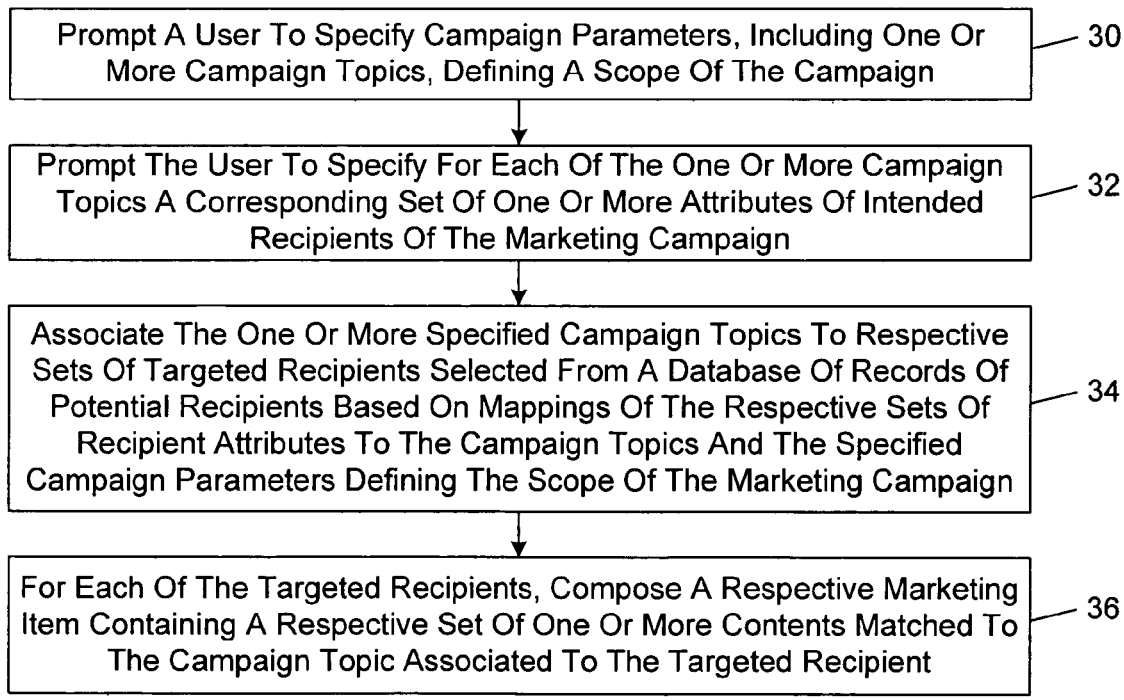
FIG. 2 is a flow diagram of an embodiment of a method of producing marketing items for a marketing campaign.

FIG. 2 shows an embodiment of a method by which the campaign management system 12 produces marketing items for a marketing campaign. In accordance with this method, the campaign management system 12 guides the user 22 through the process of specifying parameters that define the scope of the marketing campaign and attributes of intended recipients of the marketing campaign.

In particular, the campaign management system 12 prompts the user 22 to specify campaign parameters, including one or more campaign topics, which define a scope of the marketing campaign (block 30). The one or more campaign topics describe the subject matter of the marketing campaign. A campaign topic typically corresponds to one or more of the products (e.g., jewelry or flowers) or services (e.g., old age care, medical care, or job-hunting services) being offered for sale or being promoted by the marketing campaign. Campaign topics may correspond to the subjects of interest that are obtained from the results of a marketing survey. Among the other types of campaign parameters that the campaign management system 12 may prompt the user 22 to specify are a campaign optimization objective (e.g., maximize total dollar return, maximize net dollar return, or maximize the recipient response rate), a monetary budget for the marketing campaign, and a maximum number of recipients of the marketing campaign.

The campaign management system 12 also prompts the user 22 to specify for each set of one or more campaign topics a corresponding set of one or more attributes of intended recipients of the marketing campaign (block 32).

Exemplary recipient attributes that the campaign management system 12 may prompt the user to specify include demographic attributes (e.g., age, gender, income level, residential address, ethnic background, marital status, parental status, and language preference) and behavioral attributes (e.g., number of purchases from a company within a specific period of time, click through events to links within a website, recency and frequency of visits to a store or website, and a measure of the monetary responsiveness to past marketing solicitations). In some implementations, the recipient attributes include an interest attribute with variable entries corresponding to the possible campaign topics. In this way, the interest attribute provides a direct mapping between the recipients and the campaign topics. In other implementations, the campaign management system 12 may use a set of rules to map recipient attributes to the campaign topics (e.g., recipients in the age group of 45-55 are likely to be interested in the campaign topic "old-age care"). These rules (or mappings) may be generated offline based on an analysis of marketing surveys by marketing experts or may be generated by the user 22 on-the-fly by specifying to the campaign management system 12 the recipient attributes to associate with one or more user-specified campaign topics.

The campaign management system 12 associates the one or more specified campaign topics to respective sets of targeted recipients that are selected from the database 14 of records of potential recipients based on mappings of the respective sets of recipient attributes to the campaign topics and the specified campaign parameters defining the scope of the marketing campaign (block 34). In this process, the campaign management system 12 executes an optimization method that determines a set of target recipients from the recipients database 14 that is predicted to meet the campaign objective within the scope specified by the campaign parameters. The recipient attributes that are specified by the user 22 are used to segment the targeted recipients into recipient groups and to match contents in the contents database 16 to respective ones of the recipient groups. If the user does not specify a value for one of more of the recipient attributes, the campaign management system will assign the default value "Any" to the attribute, in which case that attribute will not be used in the recipient selection process. The campaign management system 12 determines mappings between the contents in the contents database 16 and the sets of campaign topics based on an analysis of the meta data that is associated with these contents. The campaign management system 12 then uses the content-to-campaign topic mappings and the recipient-to-campaign topic mappings to determine a direct mapping between the contents and the targeted recipients.

The campaign management system 12 composes for each of the target recipients a respective marketing item containing a respective set of one or more contents from the contents database 16 that are matched to the target recipient (block 36). The composed marketing items are described by respective ones of the output electronic specifications 24. The output electronic specifications 24 may be any type of electronic document, including an editable markup document (e.g., an Adobe FrameMaker® document, a rich text format document, or a Microsoft Word document), a formatted markup document (e.g., an Adobe PDF document or an Adobe PostScript document), and a rendered image document (e.g., a bit map image document). Each of the output electronic specifications 24 may describe one or more pages of content.

Figure 3:
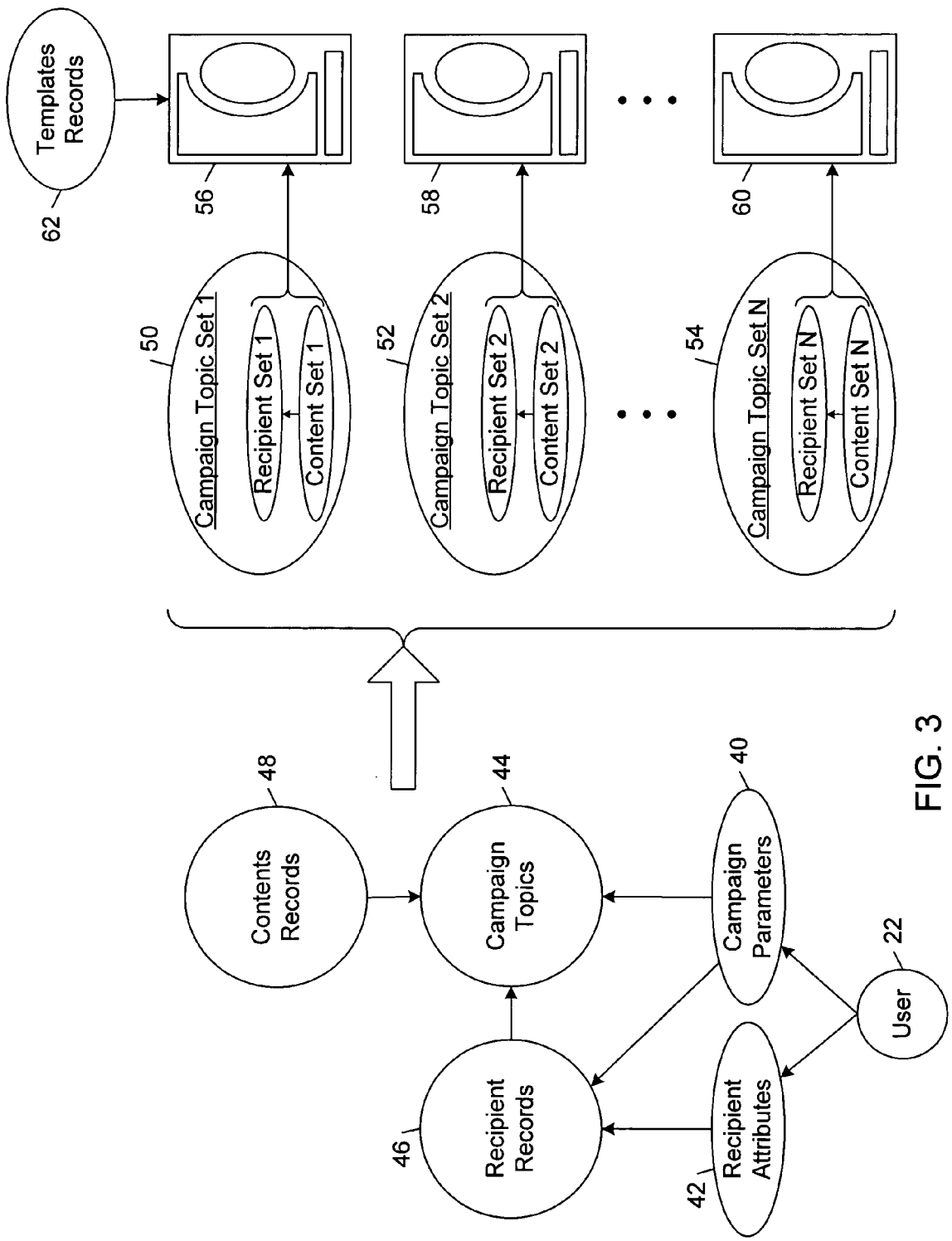
FIG. 3 is a flow diagram showing the organization and flow of data in an implementation of the marketing item production method of FIG. 2.

FIG. 3 shows the organization and flow of data in an implementation of the marketing item production method of FIG. 2. In accordance with this method, the user 22 specifies a set of campaign parameters 40 and a set of recipient attributes 42. The campaign parameters 40 define the campaign topics 44 that are the subject of the marketing campaign. The campaign management system 12 uses the campaign parameters 40 and the recipient attributes 42 to select the set of targeted recipients from the records 46 of potential recipients, segment the targeted recipients into categories, and map each of the recipient categories to a respective set of one or more of the campaign topics 44 (i.e., Campaign Topic Set 1. Campaign Topic Set 2, . . . , Campaign Topic Set N). The campaign management system 12 also maps records 48 of potential marketing item contents to the respective sets of campaign topics 44. The campaign management system 12 clusters each set of target recipient data (i.e., Recipient Set 1, Recipient Set 2, . . . , Recipient Set N) with a respective one of the sets of contents records (i.e., Content Set 1, Content Set 2, . . . , Content Set N) into groups 50, 52, 54 based on the corresponding sets of campaign topics (i.e., Campaign Topic Set 1, Campaign Topic Set 2, . . . , Campaign Topic Set N). Each campaign topic may have several sub-categories. For example, in a shoe sales marketing campaign, a campaign topic may include the sub-categories of size and location. Thus, a California recipient may receive a marketing item that includes pictures of size 7 shoes and a California store front.

In this case, contents are divided into sub-content categories (e.g. size and location). Each sub-content category is matched to the recipient. The campaign management system will merge all the content in all of the sub-categories for each recipient. The campaign management system 12 then composes respective sets 56, 58, 60 of segmented versions of the marketing items by populating one or more of the templates selected from the templates records 62 with the corresponding groups 50-54 of recipient data and the content data.

III. Campaign Management System

A. General Framework

Figure 4:
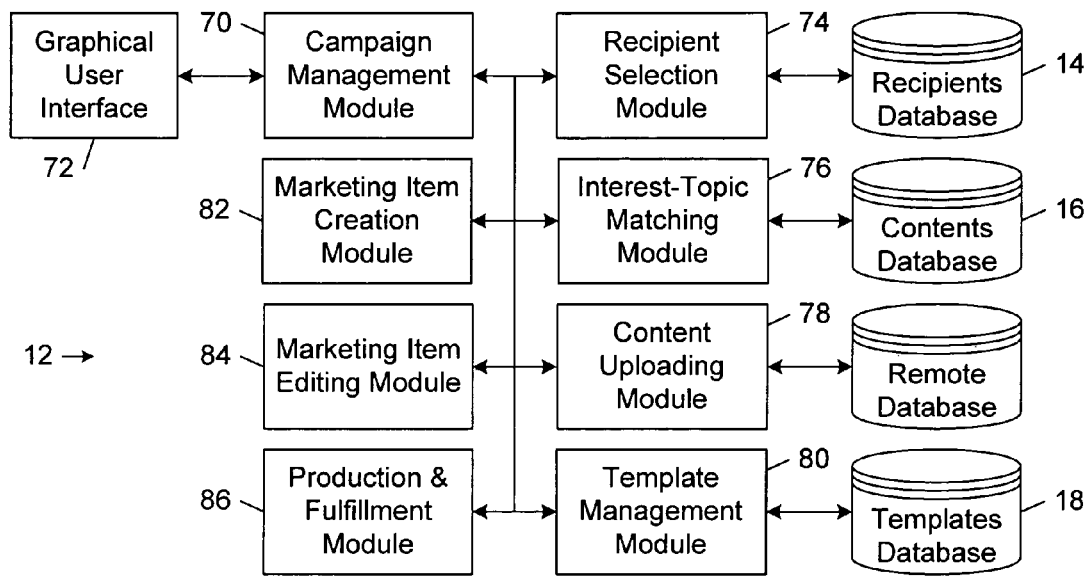
FIG. 4 is a block diagram of an embodiment of a campaign management system.

FIG. 4 shows an embodiment of the campaign management system 12 that includes a campaign management module 70, a graphical user interface 72, a recipient selection module 74, an interest-topic matching module 76, a content uploading module 78, a template management module 80, a marketing item creation module 82, a marketing item editing module 84, and a production and fulfillment module 86. The modules 70-82 of the campaign management system 12 cooperatively execute respective event-triggered workflows that are needed in various stages of the marketing item production method of FIG. 2 in order to produce marketing items in accordance with the marketing campaign intentions of the user 22.

The modules 70-86 of the campaign management system 12 may be implemented in any computing or processing environment, including in digital electronic circuitry or in computer hardware, firmware, or software. In some embodiments, these modules 70-86 are implemented by one or more respective software modules that are executed on a computer. Computer process instructions for implementing the modules 70-86 and the data generated by the modules 70-86 are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and CD-ROM.

B. Campaign Management Module

The campaign management module 70 choreographs the operations of the other modules 74-86 in executing an event-triggered set of process workflows for producing a set of marketing items in accordance with inputs received from the user 22. The campaign management module 70 is configured to automate the execution of processes within and across the domain of the campaign management system 12. The campaign management module 70 also may provide some level of process monitoring and analysis functionality. In some implementations, the campaign management module 70 operates as a client that executes one or more processes each of which invokes a respective set of one or more workflows that are executed by one or more of the service modules 74-86. The invocation of a workflow may involve sending a single message, or may consist of several message exchanges. A set of messages between a client and a service is referred to herein as a "conversation." Each interaction between a client and a service, and between the service and the set of services it invokes, occurs in the context of a conversation. For every service executed by service provider 10, a conversation audit log containing information about the context and context changes that occur during a conversation is stored.

Figure 5:
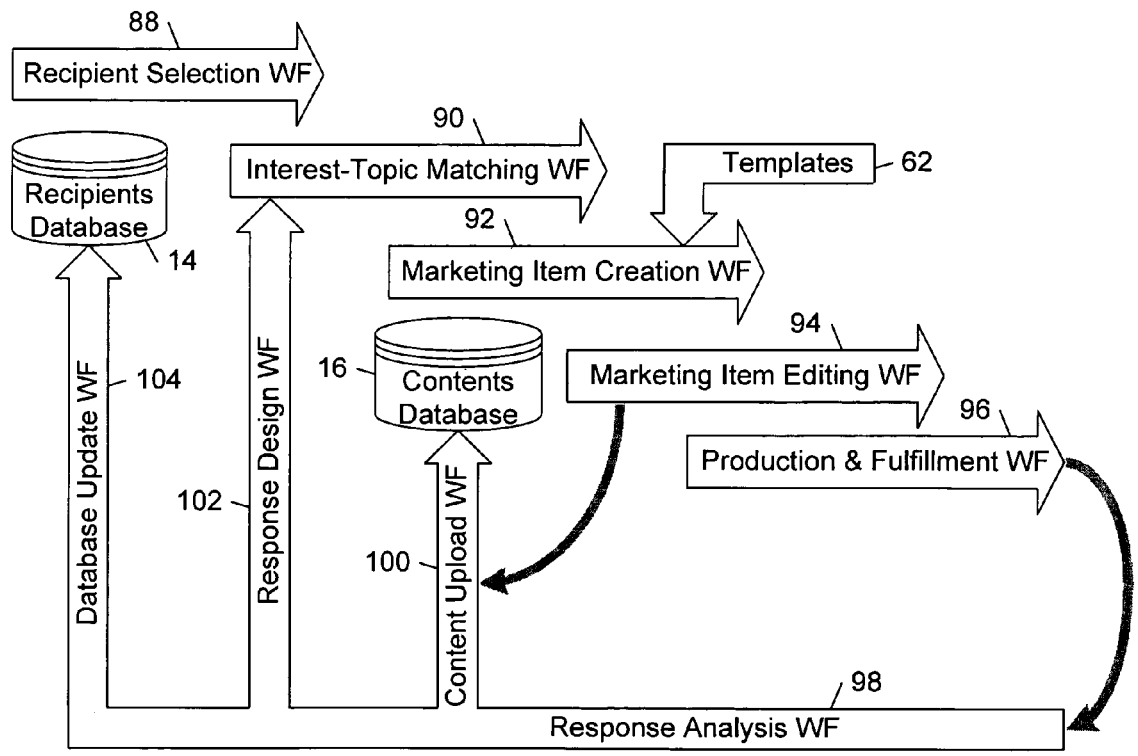
FIG. 5 is a flow diagram showing the constituent workflows that are executed by an implementation of the campaign management system of FIG. 4.

FIG. 5 shows a flow diagram of the constituent workflows that are invoked by the campaign management module 70. Among the front-end workflows are a recipient selection workflow 88, an interest-topic matching workflow 90, a marketing item creation workflow 92, a marketing item editing workflow 94, and a production and fulfillment workflow 96. The recipient selection workflow 88 is executed by the recipient selection module 74. The interest-topic matching workflow 90 is executed by the interest-topic matching module 76. The marketing item creation workflow 92 is executed by the marketing item creation module 82. The marketing item editing workflow 94 is executed by the marketing item editing module 84. The production and fulfillment workflow 96 is executed by the production and fulfillment module 86. In some implementations, the campaign management module 70 also invokes one or more optional back-end workflows that are selected from a response analysis workflow 98, a content update workflow 100, a response design workflow 102, and a database update workflow 104. Detailed descriptions of the workflows 88-104 are provided in the sections III.D-III.I below.

C. Graphical User Interface

The user 22 interacts with the campaign management system 12 through the graphical user interface 72. In the illustrated embodiments, the graphical user interface 72 presents command options to the user 22 in the form of pictorial buttons and lists on a computer screen. The user 22 uses a computer mouse and a keyboard to input commands, enter data, and make selections. In some implementations, the graphical user interface 72 is a Web-based interface.

The graphical user interface 72 provides an uncluttered interface for guiding the user 22 through an integrated process of selecting targeted recipients, designing personalized and customer-tailored marketing items, and producing the designed marketing items. The graphical user interface 72 also clearly indicates the current state of the campaign management system 12 so that the user will have an intuitive understanding of the marketing item production process and feel comfortable using the system.

D. Recipient Selection Workflow

The recipient selection workflow 88 is initiated each time the user 22 begins a new marketing campaign. In this workflow, the user 22 inputs various campaign parameters and attributes of intended recipients that define the user's marketing intentions, the recipient selection module 74 selects a set of targeted recipients that optimizes the user's campaign goals, and the campaign management system 12 presents the optimization results to the user 22.

1. Defining the User's Marketing Intentions

Figure 6:
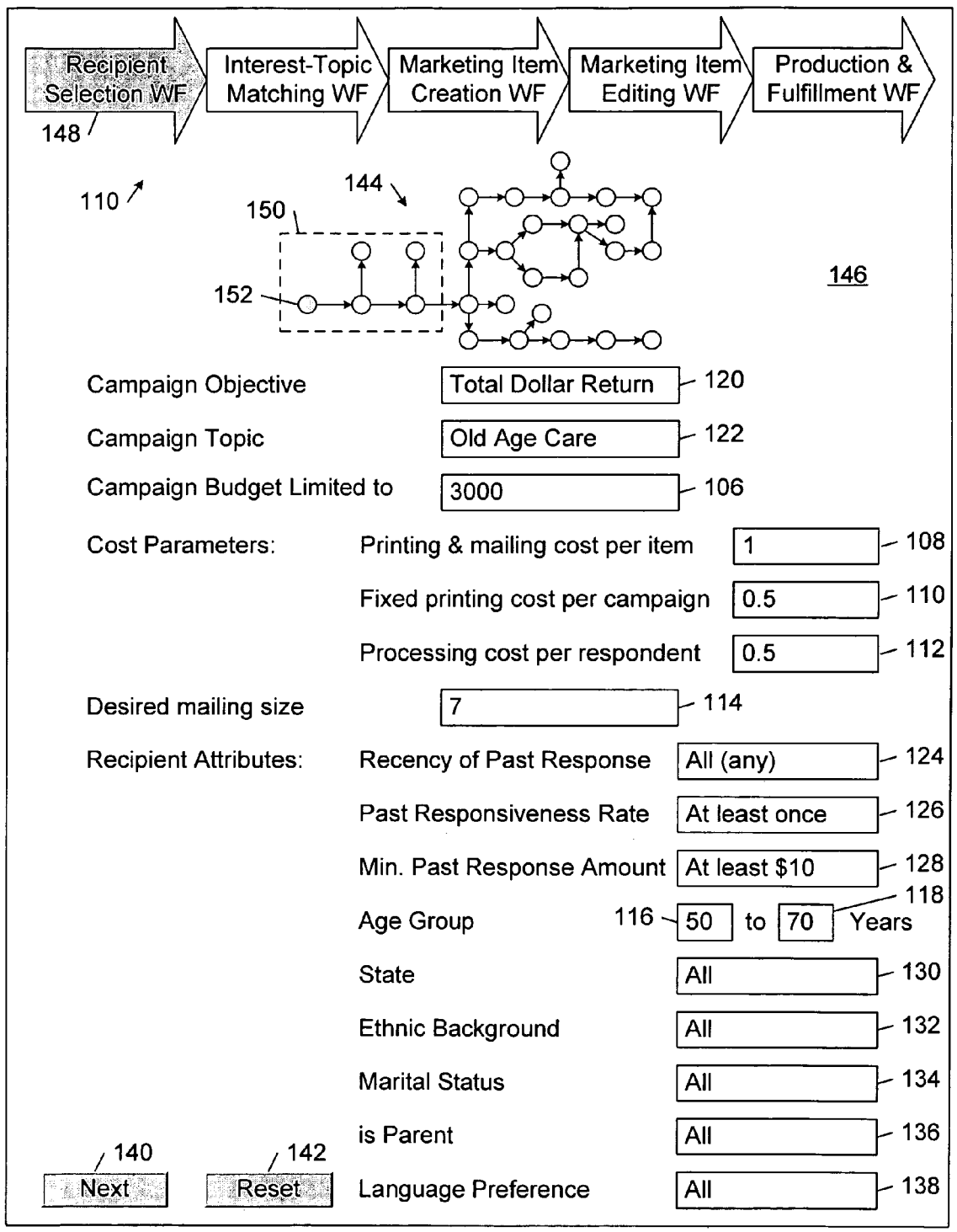
FIG. 6 is a diagrammatic view of an embodiment of a graphical user interface prompting a user to specify campaign parameters and attributes of intended recipients of a marketing campaign.

FIG. 6 shows a graphical user interface 146 that is presented to the user 22 at the beginning of the marketing item production process. The graphical user interface 146 presents text input fields 106, 108, 110, 112, 114, 116, 118 prompting the user 22 to input textual information, drop down lists 120, 122, 124, 126, 128, 130, 132, 134, 136, 138 prompting the user 22 to select one or more predefined input values, and graphical buttons 140, 142 prompting the user 22 to input commands (e.g., proceed to "Next" stage, and "Reset" parameter and attribute values).

The graphical user interface 146 also presents a graphical depiction 110 of the sequence of front-end workflows that the campaign management system 12 steps through in the process of producing a set of marketing items for a marketing campaign. The graphical user interface 146 highlights the workflow that corresponds to the current state of the campaign management system 12. In FIG. 6, the graphical user interface 146 highlights the Recipient Selection WF arrow 148 in the front-end workflow sequence 110 to indicate that the user 22 is operating in the Recipient Selection workflow stage of the process.

The graphical user interface 146 additionally presents a tree map 144 of nodes that graphically depict the different stages in the marketing item production process and the various states of the campaign management system 12 during each stage. In FIG. 6, the graphical user interface 146 indicates that the current recipient selection stage includes the campaign management system states that are enclosed within the dashed box 150. The graphical user interface 146 also highlights node 152 to indicate that the campaign management system 12 currently is in the "campaign parameter and recipient attribute input" state.

In operation, the user 22 selects a campaign objective from the "Campaign Objective" drop down list 120. In the illustrated embodiment, the graphical user interface 146 presents the user 22 with a choice of three campaign objectives: maximize total dollar return, maximize net dollar return, and maximize recipient response rate. The user also selects a campaign topic from the drop down list 122 and enters a campaign budget in the text field 106. In the illustrated embodiment, the graphical user interface 146 presents the user 22 with a choice of predefined campaign topics that correspond to the products or services being offered or promoted by the marketing campaign or to a set of topics of interest that are determined from past marketing surveys and responses to past marketing solicitations.

The graphical user interface 146 presents the user 22 with a set of cost parameter input fields 108-112. These parameters relate to the cost of rendering the marketing items and distributing the marketing items to the set of targeted recipients. The values of these fields 108-112 may be entered automatically based on information received from an analysis of historical cost data or from information received from business entities that will be used to render and distribute the marketing items. The user 22 may enter new values or modify default values in the cost parameter input fields 108-112.

The user 22 enters the desired mailing size in the text input field 114. This parameter limits the number of marketing items that will be produced by the campaign management system.

The graphical user interface 146 prompts the user 22 to input attribute values of intended recipients of the marketing campaign in drop down lists 124-138 and in text input fields 116, 118. If the user does not specify a value for one or more of the attributes, the campaign management system will assign the default value "Any" to the attribute, in which case that attribute will not be used in the recipient selection process. The value selected from the "Recency of Past Response" drop down list 124 sets a maximum value for the recency of recipient responsiveness to past marketing solicitations. The value selected from the "Past Responsiveness Rate" drop down list 126 sets a minimum rate of recipient responsiveness to past marketing solicitations. The value selected from the "Min. Past Response Amount" drop down list 128 sets a minimum monetary amount of recipient response to past marketing solicitations. The values entered in the "Age Group" text fields 116, 118 determine the age group of the targeted recipients. The value selected from the "State" drop down list 130 determines the state wherein the target recipients live. The value selected from the "Ethnic Background" drop down list 132 determines the ethnic background of the targeted recipients. The value selected from the "Marital Status" drop down list 134 determines the marital status of the targeted recipients. The value selected from the "is Parent" drop down list 136 determines the marital status of the targeted recipients. The value selected from the "Language Preference" drop down list 138 determines the language preference of the targeted recipients.

2. Selecting the Targeted Recipients

As explained above, the campaign management system 12 associates the one or more specified campaign topics to respective sets of targeted recipients that are selected from the database 14 of records of potential recipients based on mappings of the respective sets of recipient attributes to the campaign topics and the specified campaign parameters defining the scope of the marketing campaign (block 34; FIG. 2). In this process, the recipient selection module 74 executes an optimization method that determines a set of target recipients from the recipients database 14 that is predicted to meet the campaign objective within the scope specified by the campaign parameters.

The recipient selection module 74 uses the predicted response rate, coupled with the predicted amount spent and any input attributes, to sort the recipient list. For example, for the specified goal of maximizing total dollar return, the recipient selection module 74 filters out each recipient in the database 14 based on whether they match the specified recipient attributes. The recipient selection module 74 then multiplies the predicted response rates of the remaining recipients by the predicted dollar spent and inserts the remaining recipients into a sorted list based upon the result of the multiplication. The recipient selection module 74 selects recipients starting at the top of the list until either the budget runs out or the size of the mailing is reached. With respect to the goals of maximizing net dollar return and maximizing the response rate, the sorting calculations are different. For example, for the goal of maximizing response rate, the recipient selection module 74 filters out recipients based upon attributes and sorts the remaining recipients based on the predicted response rate without factoring in the estimated dollar spent.

In some embodiments, the recipient selection module 74 uses customer segmentation as a basis for mathematically deriving a campaign plan for allocating the marketing items to targeted recipients. In some implementations, business management parameters, such as business objectives and budget constraints, also are incorporated in the marketing item allocation process. The customer segmentation is a mapping of visitors to a smaller number of segments to reflect commonality of attributes perceived to be relevant to customer activity. The desired activity may be the completion of a registration sequence or may be transactional, such as the purchase of goods or services (collectively, "product").

These embodiments include an optimization engine that has inputs of stored customer segment information, stored marketing item information, stored market information, and stored management information. The various forms of information are utilized to provide marketing strategies on a promotion-by-promotion basis and customer segment-by-customer segment basis. In order to achieve global objectives for the campaign, while honoring global constraints, a given promotion may be allocated to a fraction of the customers within a particular segment. In this approach, a marketing campaign may be expressed as a table in which the rows represent segments and the columns represent marketing actions. Each cell in the table holds an assigned percentage representing the percentage of customers in the segment that is to be presented with the marketing action. As an example, there may be ten customer segments and each customer segment may have a different designated percentage of customers who will be made aware of the promotion (e.g., ranging from 20% for Segment1 to 40% for Segment10).

Figure 7:
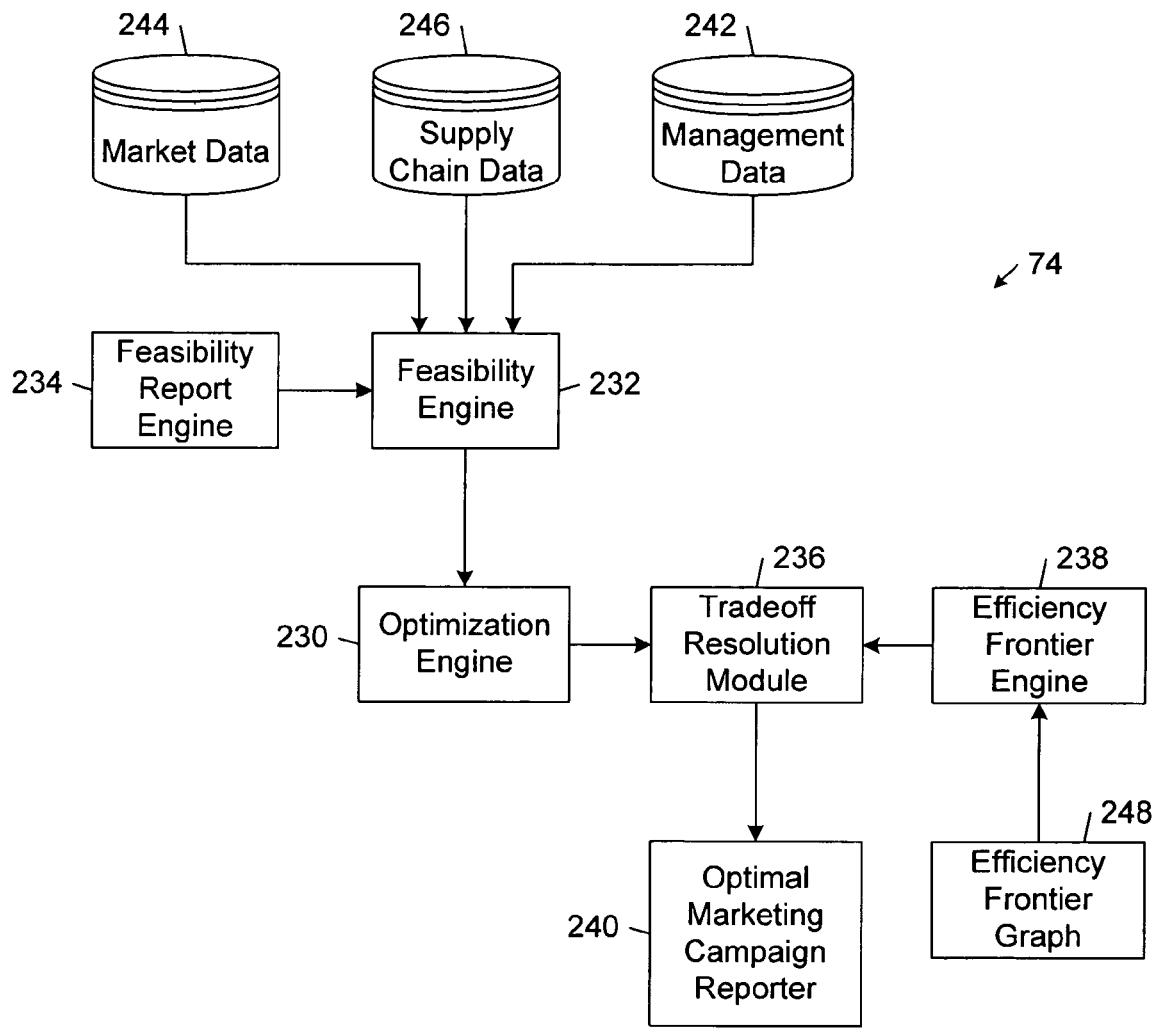
FIG. 7 is a block diagram of an embodiment of a recipient selection module.

FIG. 7 shows an embodiment of the recipient selection module 74 that includes an optimization engine 230, a feasibility engine 232, a feasibility report engine 234, a tradeoff resolution module 236, an efficiency frontier engine 238, and an optimal marketing campaign reporter 240. The modules 230-240 of the recipient selection module 74 may be implemented in any computing or processing environment, including in digital electronic circuitry or in computer hardware, firmware, or software. In some embodiments, these modules 230-240 are implemented by one or more respective software modules that are executed on a computer. Computer process instructions for implementing the modules 230-240 and the data generated by the modules 230-240 are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and CD-ROM.

In the embodiment shown in FIG. 7, the recipient selection module 74 obtained information from three data sources: a store 242 of management data, a store 244 of market data, and a store 246 of supply chain data.

The store 242 of management data includes marketing information, business objective information, and business constraint information. The marketing information may merely be promotion identification numbers and descriptions, as well as promotion awards (e.g., discounts). The business objective information can include a hierarchy of different business objectives, such as a ranking of profit, revenue, and conversion ratio. Such a hierarchy enables the trade-off resolution module 236 to handle inevitable trade-offs between business objectives. For example, if net dollar return is identified as a main business objective, while total dollar return is identified as a secondary business objective, conflicts can be resolved using the efficiency frontier engine 238, which determines the "optimal" trade-offs between the main business objective and the secondary business objective. For example, suppose there is a maximum profit of X and the user 22 specifies that the maximum acceptable profit "loss" is 10%. In this case, the secondary business objective of total dollar return is to maximize the revenue subject to the constraint that at least 0.9·X of net dollar return is to be realized. The main output of the efficiency frontier engine 238 is an efficiency frontier graph 248 of the main and secondary objectives.

In some implementations, the user 22 specifies business constraints and rules that include the minimum and maximum overall campaign budget limits and the minimum and maximum limits for the individual customer segments. In this way, the allocation of the different promotions may be determined on a customer segment-by-customer segment basis. Business constraints and rules also may include the maximum number of promotions to be offered to a particular customer in a given segment, as well as the minimum number of customers in a segment that are to be offered a particular promotion. This lower limit may be a minimum sample size in order to improve accuracy of market data to be collected during a test stage. Business rules also may specify conditions of customer eligibility for a particular promotion.

The store 244 of market data may be collected during a testing stage or may be acquired historical data. The market data includes the mapping of each customer to a specific customer segment. Conversion probabilities are also stored. A conversion probability is an estimated probability that a customer in a particular segment will "convert" (e.g., purchase a product) after being presented with a specific promotion. Segment size is the number of customers in a segment for whom a promotion has not been offered and has not been converted. The market data preferably also includes "null promotion data". Promotion revenue is the revenue acquired from the purchase of a product by a customer in a segment after seeing a promotion, while null promotion revenue is the revenue from the purchase of the same product by a customer in the same segment without any offer of a promotion of the product. Promotion costs are those that result from the purchase of a product by a customer in a segment after seeing a promotion, while null promotion costs are those resulting from the purchase of the same product by a customer in the same segment without a promotional offer. The promotion cost typically is the sum of the product cost and the cost of offering and accepting the promotion (e.g., free shipping and handling). The null product cost typically is only the cost of the product.

The supply chain data 246 includes information regarding on-hand inventories and on-order inventories. The supply chain data 246 also may include measurement variables regarding replenishing product when inventory is depleted. The supply chain data 246 may be shared by a supply chain system that uses the recipient selection system 74 to forecast procurement needs. That is, the purchase of inventory may be at least partially based upon the campaign plan for promoting the purchase of products. With regard to the flow of supply chain data to the supply chain system, the advantage is that a greater amount of information is available to the approach of determining when to order product and determining the volume of product to be ordered. On the other hand, with regard to the flow of supply chain data to the optimization system, the advantage is that products are less likely to be promoted when there are availability problems. Thus, customer satisfaction is improved during promotion campaigns.

The feasibility engine 232 automatically identifies contradictions in the data received from the data stores 242, 244, 246. For example, the management data 242 may contain one or more contradictions, such as a conflict between two business constraints. A contradiction is distinguishable from a trade-off described with reference to the tradeoff resolution module 236 by the fact that contradictory considerations conflict and typically are mutually exclusive so that only one such consideration can be achieved. The feasibility engine 232 is connected to the feasibility report engine 234 that reports the contradictions and any corrections that are determined automatically by the feasibility engine 232. The feasibility engine 232 may include a built-in (i.e., default) hierarchy for automatically correcting budget infeasibilities. The user may modify or replace the default hierarchy with a different hierarchy.

The output of the feasibility engine 232 is an input to the optimization engine 230, which provides an input to the trade-off resolution module 236. The optimization engine 230 detects and addresses inconsistencies between business objectives. The operations of the optimization engine 92 and the trade-off resolution module 236 determine allocations of promotions to customer segments in such a way that the increased values of the main business objective and any secondary business objectives are maximized, while the business constraints and rules are satisfied.

In some implementations, the user 22 may run the optimization engine 230 without entering budget constraints after initial market data is entered into the market data store 244. The optimization engine 230 will then determine an overall maximum budget for the unconstrained parameter. This initial budget may be cost prohibitive. Thus, the efficiency frontier engine 238 will determine an efficiency frontier between the main business objective and the maximum overall budget, where the maximum overall budget varies discretely from zero to the value of the initial budget.

The recipient selection module 74 outputs the identities of an optimal number of customers in each segment that will be offered a marketing item in a marketing campaign. An optimal marketing campaign plan is generated and reported by the optimal marketing campaign reporter 240. The following output reports may be calculated from this main output: (1) an optimal main business objective value; (2) budgets for promotional campaign implementation; (3) fractions of customers in each segment to be offered a promotion; (4) the expected number of customers in each segment that will accept promotional offers; and (5) the expected profit by promotion.

Additional details regarding the structure and operation of the embodiment of the recipient selection module shown in FIG. 7 may be obtained from U.S. application Ser. No. 09/851,514, which was filed May 18, 2001, by Dirk M. Beyer et al, is entitled "Method and System of Determining Differential Promotion Allocations, and is incorporated herein by reference.

3. Presenting the Optimization Results

Figure 8:
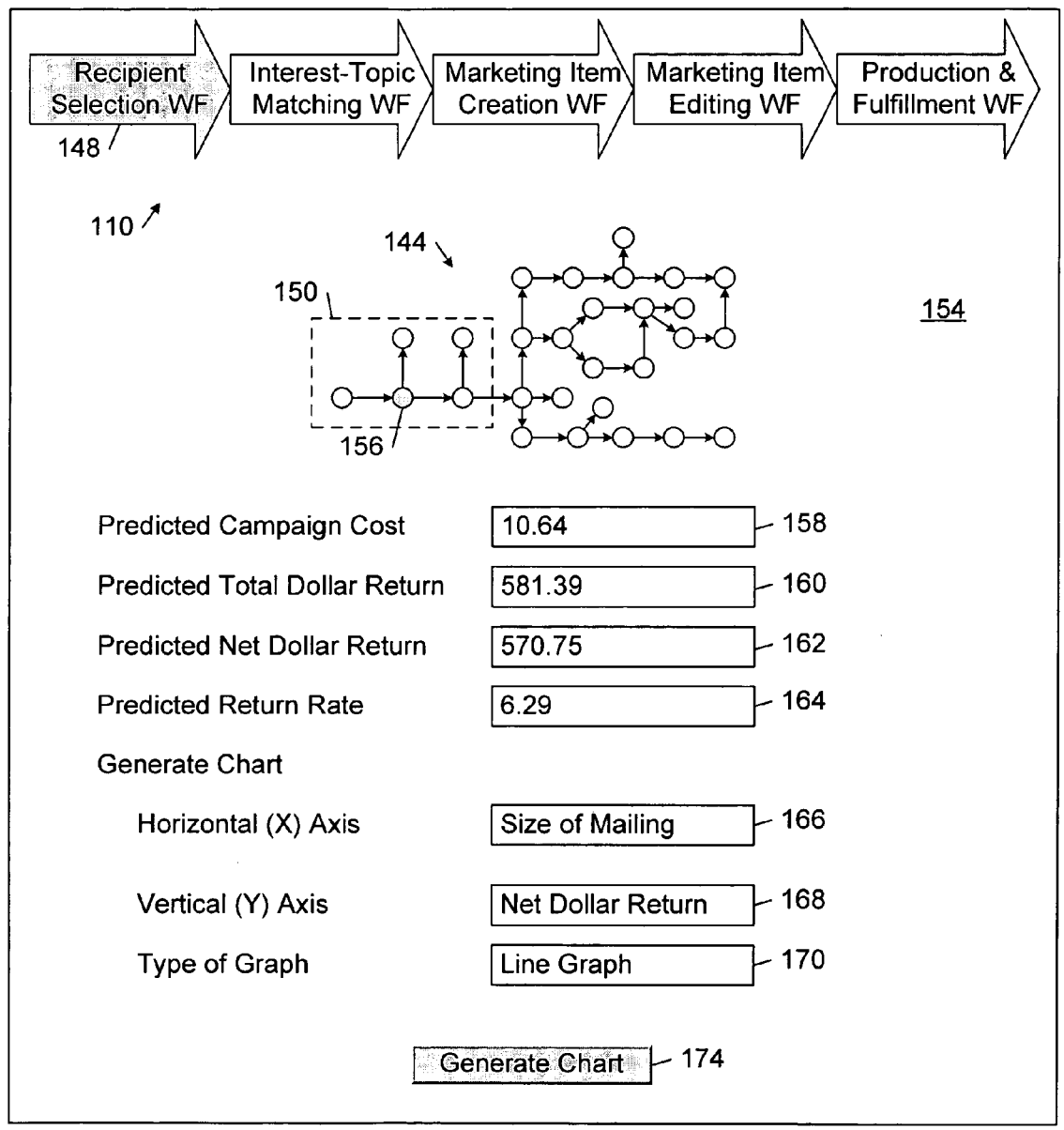
FIG. 8 is a diagrammatic view of an embodiment of a graphical user interface showing the results of an optimization process for selecting recipients of a marketing campaign.

FIG. 8 shows a graphical user interface 154 that is presented to the user 22 after the user has selected the Next command button 140 in the graphical user interface 146 (FIG. 6) and the recipient selection module 74 has selected a set of targeted recipients from the records in the recipients database 14. The graphical user interface 154 highlights the Recipient Selection WF arrow 148 in the front-end workflow sequence 110 to indicate that the user 22 still is operating in the recipient selection workflow stage of the process. The graphical user interface 146 also highlights the node 156 to indicate that the campaign management system 12 is in the "present optimization result" state.

In this state of the campaign management system 12, the graphical user interface 154 presents different parameters describing outcomes of the marketing campaign that are predicted for the targeted set of recipients. In the illustrated embodiment, the graphical user interface 154 presents the "Predicted Campaign Cost" in the text field 158, the "Predicted Dollar Return" in the text field 160, the "Predicted Net Dollar Return" in the text field 162, and the "Predicted Return Rate" in the text field 164.

The graphical user interface 154 also prompts the user 22 to select the parameters of a chart that will graphically show relationships among selected ones of the marketing campaign parameters, including the predicted campaign outcome parameters. The graphical user interface 154 presents in the drop down lists 166, 168 various parameters of the marketing campaign that may be plotted on the horizontal and vertical axes of the chart. For example the net dollar return may be plotted as a function of the size of the mailing, and the response rate may be plotted as a function of net dollar return. The graphical user interface 154 presents the user 22 with a choice of graph types (e.g., line graph, 3D bar chart, etc.) in the "Type of Graph" drop down list 170.

Figure 9:
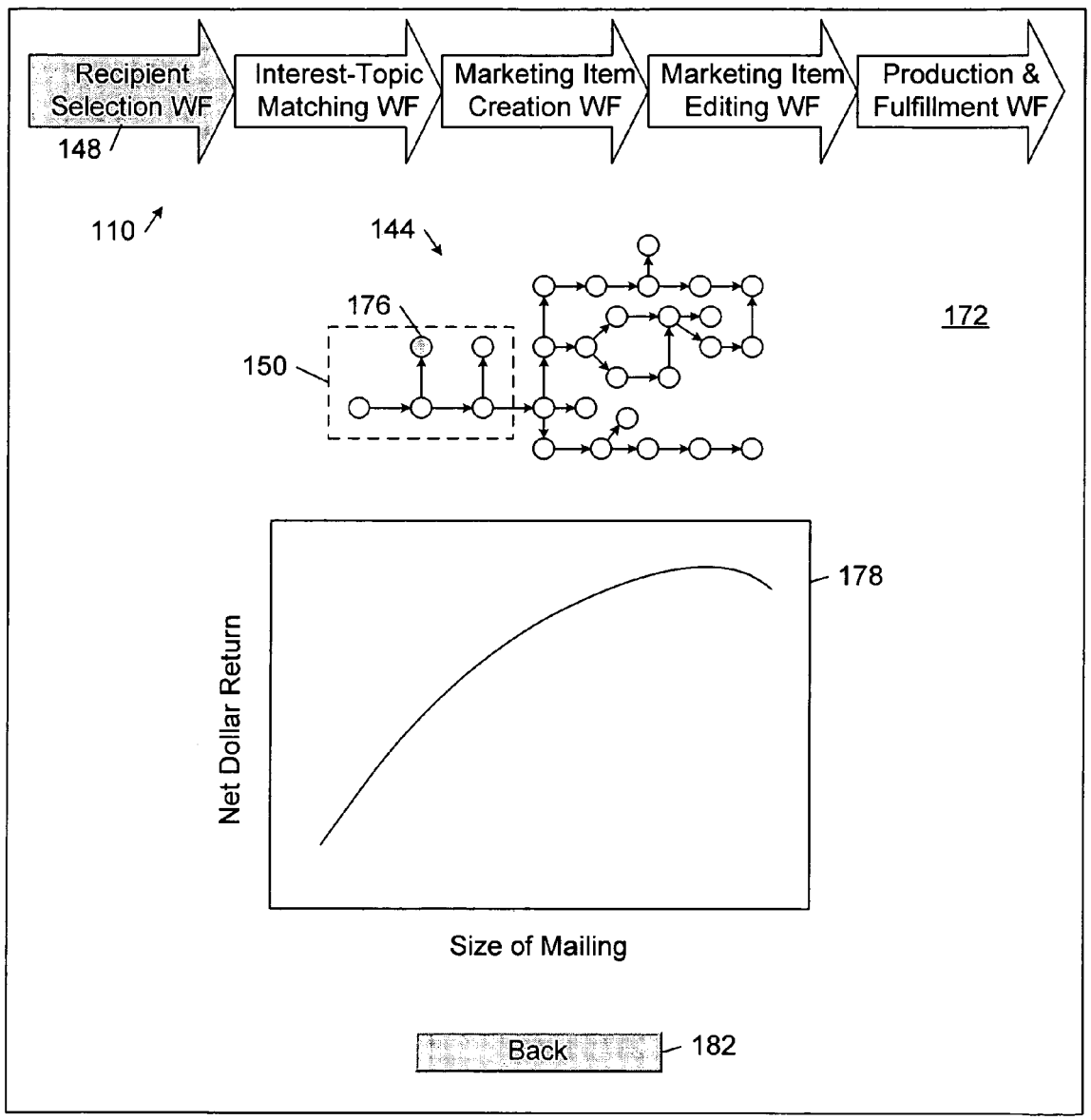
FIG. 9 is a diagrammatic view of an embodiment of a graphical user interface showing a chart of net dollar return as a function of mailing size in accordance with an optimization process for selecting recipients of a marketing campaign.

FIG. 9 shows a graphical user interface 172 that is presented to the user 22 after the user has entered the chart parameter values and selected the Generate Chart command button 174 in the graphical user interface 154. The graphical user interface 172 highlights the Recipient Selection WF arrow 148 in the front-end workflow sequence 110 to indicate that the user 22 still is operating in the recipient selection workflow stage of the process. The graphical user interface 172 also highlights the node 176 to indicate that the campaign management system 12 is in the "view chart" state. In this state of the campaign management system 12, the graphical user interface 172 presents a chart 178 showing the relationships between the parameters selected in the input fields 166-170 of the graphical user interface 154 (FIG. 8).

The user 22 may iteratively vary the selected values of the campaign parameters and the recipient attributes and review the predicted outcomes of the marketing campaign presented in the graphical user interfaces 154, 172 to obtain a better understanding of how the selected parameter and attribute values affect the outcome of the marketing campaign.

Figure 10:
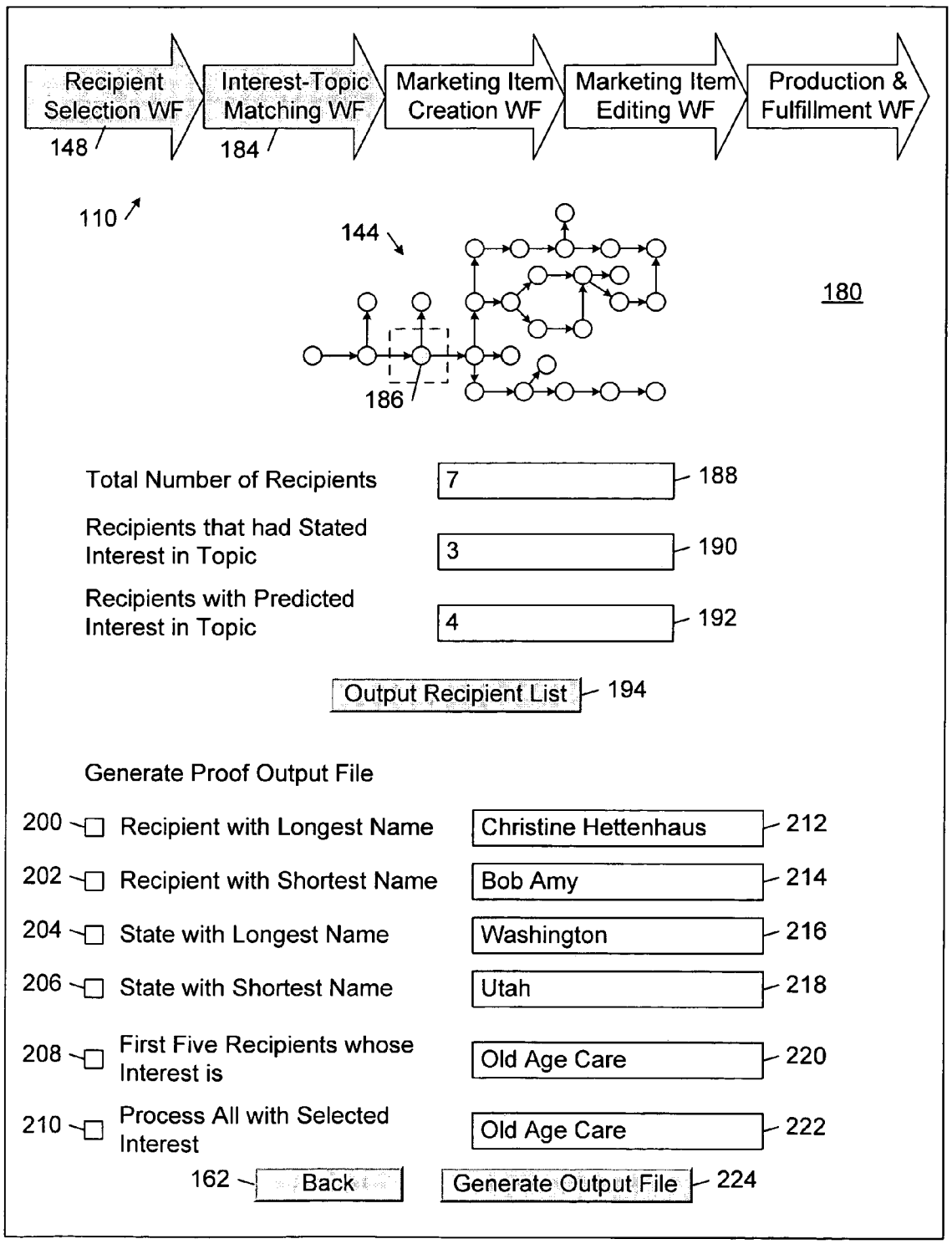
FIG. 10 is a diagrammatic view of an embodiment of a graphical user interface showing statistics of recipients selected by an optimization process.

FIG. 10 shows a graphical user interface 180 that is presented to the user 22 after the user has selected the Back command button 182 in the graphical user interface 172 (FIG. 9). The graphical user interface 180 highlights the Recipient Selection WF arrow 148 and the Interest-Topic Matching WF arrow 184 in the front-end workflow sequence 110 to indicate that the user 22 is operating in both the recipient selection workflow and the interest-topic matching workflow stages of the process. The graphical user interface 180 also highlights the node 186 to indicate that the campaign management system 12 is in the "view recipient statistics" state.

In this state of the campaign management system 12, the graphical user interface 180 presents text fields 188, 190, 192 statistics relating to the targeted recipients selected by the recipient selection module 74 based on the optimization process described above. The "Total Number of Recipients" test field 188 shows the total number of targeted recipients that were selected by the recipient selection module 74. The "Recipients that had Stated Interest in the Topic" text field 190 shows the number of targeted recipients with recipient records containing an Interest attribute corresponding to the campaign topic selected by the user in the graphical user interface 146 (FIG. 6). The "Recipients with Predicted Interest in Topic" text field 192 shows the number of targeted recipients with recipient records that did not contain an Interest attribute corresponding to the selected campaign topic but that did contain attributes from which the recipient selection module 74 could infer that the recipient would likely have an interest in the selected campaign topic. In the recipient selection process, the recipient selection module 74 determines these targeted recipients based on a mapping between recipient attributes and the selected campaign topic.

The user 22 may view a list of the records of the targeted recipients by selecting an "Output Recipient List" command button 194.

Figure 11:
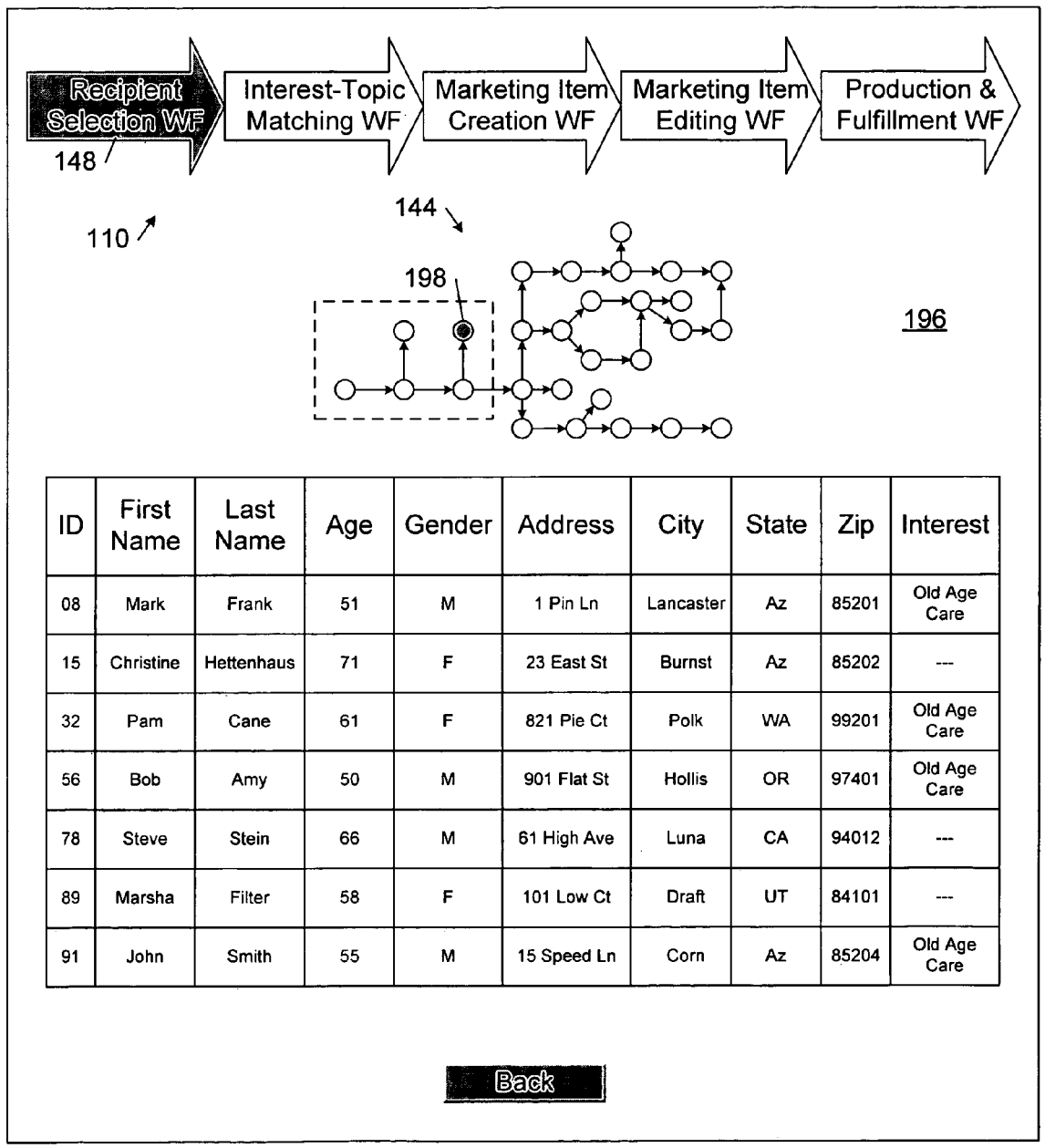
FIG. 11 is a diagrammatic view of an embodiment of a graphical user interface showing a set of attributes of recipients selected by an optimization process.

FIG. 11 shows a graphical user interface 196 that is presented to the user 22 after the user has selected the Output Recipient List command button 194. The graphical user interface 196 highlights the Recipient Selection WF arrow 148 in the front-end workflow sequence 110 to indicate that the user 22 is operating in the recipient selection workflow. The graphical user interface 180 also highlights the node 198 to indicate that the current state of the campaign management system 12 is in the "view list of recipients" state. In this state of the campaign management system 12, the graphical user interface 196 presents a list of the records from the recipients database 14 that correspond to the targeted recipients. In the example shown in FIG. 10, each of the recipient records includes the following attributes: ID, First Name, Last Name, Age, Gender, Address, City, State, Zip, and Interest.

Referring back to FIG. 10, the graphical user interface 180 additionally presents the user 22 with check boxes 200, 202, 204, 206, 208, 210 for selecting different output files that may be proofed before the campaign management system 12 transmits the output electronic specifications 24 (FIG. 1) of the marketing items to the rendering platform 20 (FIG. 1). The "Recipient with the Longest Name" check box 200 allows the user to view a proof file generated for the targeted recipient with the longest name, which is shown in the adjacent text field 212. The "Recipient with the Shortest Name" check box 202 allows the user is to view a proof file generated for the targeted recipient with the shortest name, which is shown in the adjacent text field 214. The "State with the Longest Name" check box 204 allows the user to view a proof file generated for the targeted recipient with the longest state name, which is shown in the adjacent text field 216. The "State with the Shortest Name" check box 206 allows the user to view a proof file generated for the targeted recipient with the shortest state name, which is shown in the adjacent text field 218. The "First Five Recipients whose interest is" check box 208 allows the user to view proof files generated for the first five of the targeted recipients whose interest is specified in the adjacent text field 220. The "Process All with Selected Interest" check box 210 allows the user to view proof files generated for the all of the targeted recipients whose interest is specified in the adjacent text field 222.

The user 22 may trigger the generation of the output electronic specifications 24 (FIG. 1) by selecting a Generate Output File command button 224. In response to the selection of the Generate Output File command button 224, the campaign management module 70 sends a request for the interest-topic matching module 76 to execute the interest-topic matching workflow in order to match contents from the contents database 16 to the targeted recipients selected by the recipient selection module 74. The campaign management module 70 then sends a request for the marketing item creation module 82 to execute the marketing item creation workflow in order to compose a personalized and custom-tailored marketing item for each of the targeted recipients.

E. Interest-Topic Matching Workflow

As explained above, the recipient selection module 74 matches the targeted recipients to one or more marketing item types, each of which is associated with a respective variable data template selected from the templates database 18 (FIG. 1). The interest-topic matching module 76 typically matches contents to the targeted recipients based on the variable data fields in the corresponding marketing item templates. For example, if a selected one of the targeted recipients is matched to a given template that has one variable image field and one variable copy field, the interest-topic matching module 76 will select from the contents database 16 one image and one copy item that are matched to the attributes of the selected targeted recipient.

In general, the interest-topic matching module 76 may use any one or a wide variety of methods for automatically matching contents in the contents database to the targeted recipients selected by the recipient selection module 74. In some embodiments, the recipient attributes that are specified by the user 22 are used to segment the targeted recipients into recipient groups and to match contents in the contents database 16 to respective ones of the recipient groups. In particular, the campaign management system 12 determines mappings between the contents in the contents database 16 and the sets of campaign topics based on an analysis of the meta data that is associated with these contents. The campaign management system 12 then uses the content-to-campaign topic mappings and the recipient-to-campaign topic mappings to determine a direct mapping between the contents and the targeted recipients.

F. Marketing Item Creation Workflow

In response to the user's selection of the Generate Output File command button 224 in the graphical user interface 180 (FIG. 10), the marketing item creation module 82 generates the output electronic specifications 24 of the marketing items for the targeted recipients. In this process, the marketing item creation module 82 integrates the contents selected for each targeted recipient into a respective variable data template that is contained in the templates database 16. In some implementations, the marketing item creation module 82 generates output electronic specifications 24 for all of the targeted recipients. In other implementations, the marketing item creation module 82 generates only output electronic specifications 24 for the targeted recipients corresponding to the proof output files selected by the user 22.

Figure 12:
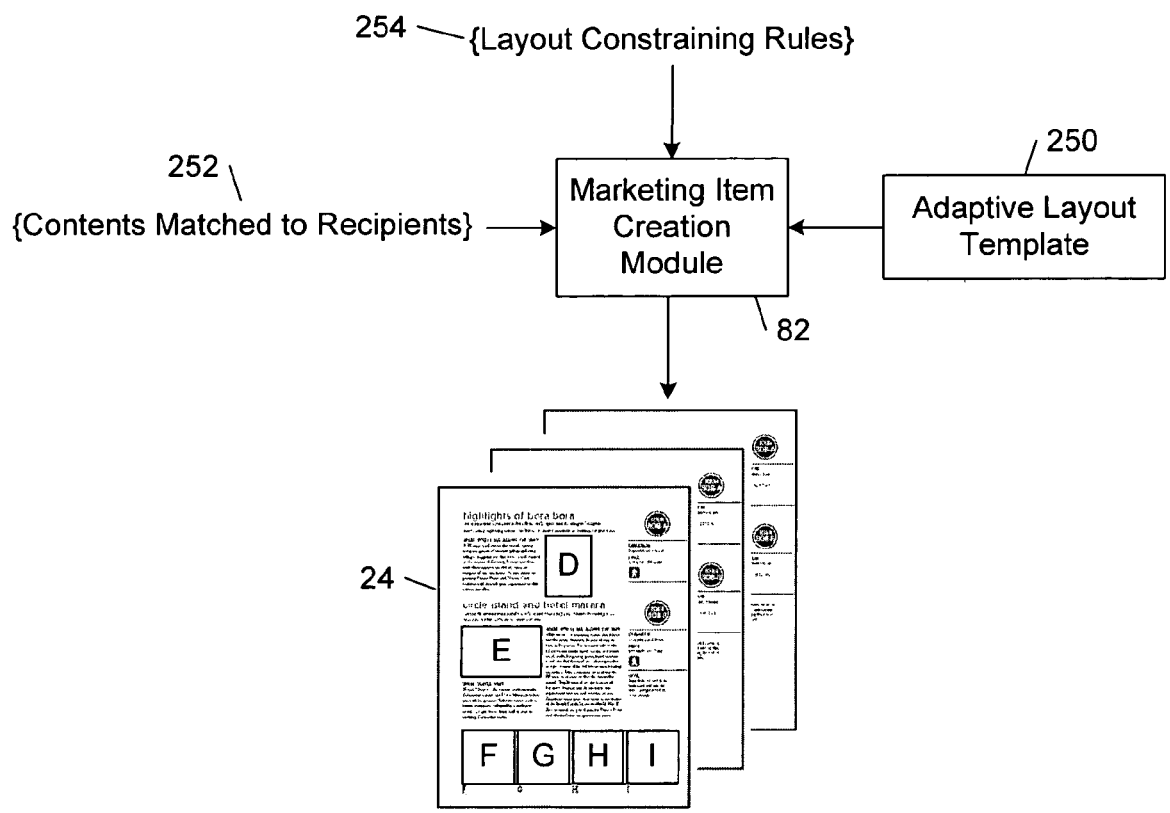
FIG. 12 is a diagrammatic view of data flow in an embodiment of a method of composing marketing items.

FIG. 12 shows an embodiment of a method by which the marketing item creation module 82 generates the output electronic specifications 24 of the marketing items from an adaptive layout template 250 that can be populated with variable content from the contents database 16 to produce a personalized and custom-tailored marketing item for each of the targeted recipients. In this embodiment, the marketing item creation module 82 generates the output electronic specifications 24 of the marketing items based on the adaptive layout template 250 and the contents 252 that are respectively matched to the targeted recipients and on set of layout constraining rules 254 that define implicit logical blocks in the adaptive layout template 250 and constrain layout variations among these implicit logical blocks to achieve a consistent look and feel across the marketing items for each adaptive template type while accommodating variable content.

In some embodiments, the adaptive layout template 250 includes adaptive layout attributes that define the attributes and layout of implicit logical blocks. The term "logical block" refers to a region of content in the electronic document that is determined to have a homogenous content style and a homogenous semantic context (e.g., document title, header, and paragraph for logical blocks containing textual content). The layout style of a logical block is described by a style attribute vector, which includes an indication of the content type (e.g., text, image, or vector graphic) and a set of style attributes. In one implementation, the style attributes describe: font size, font family, color, orientation, bounding box coordinates, and outline polygon coordinates for textual content; the aspect ratio, the shape, the bounding box coordinates, and outline polygon coordinates for image content; and bounding box coordinates and outline polygon coordinates for vector graphic content. The "outline polygon" of a logical block corresponds to a polygon that encompasses and traces the outline of the content of the logical block. The "bounding box" of a logical block refers to the smallest rectangle with vertical and horizontal sides that encompasses the outline polygon of the logical block.

The adaptive layout template 250 assigns to each of the adaptive layout attributes a symbolic expression representing a variable value. This enables the adaptive layout template 250 to accommodate variable content. As used herein the term "symbolic expression" refers broadly to a mathematical or logical symbol or a meaningful combination of symbols. For example, in some cases, a symbol representing a single variable value may be assigned to an adaptive layout attribute. In other cases, a mathematical expression that includes one or more symbols representing variable values and one or more mathematical operators may be assigned to an adaptive layout attribute.

In some embodiments, the adaptive layout template 250 is are generated offline based on an existing input electronic document (e.g., a centrally produced marketing item) in accordance with the process described in U.S. patent application Ser. No. 11/093,473, which was filed Mar. 30, 2005, by Xiaofan Lin, and is entitled "Adaptive Layout Templates For Generating Electronic Documents With Variable Content," and is incorporated herein by reference.

The layout constraining rules 254 define the permissible variations in the layout relationships among the implicit logical blocks in the adaptive layout template 250, including gap relationships, overlap relationships, embedding relationships, and alignment relationships. These rules 254 also determine relationships between the implicit logical blocks and the pages of the adaptive layout template 250, including page margins, content bleeding, and repetitive patterns. Each of the implicit logical blocks corresponds to a respective one of the explicit logical blocks in the output electronic specifications 24 and accommodates variable content having the content style that is assigned to the corresponding explicit logical block.

In general, the layout constraining rules 254 may be expressed in any suitable mathematical form that is capable of describing the layout and geometric relations among the implicit logical blocks, such as above, below, left of, right of, inside, and overlaps. In the illustrated embodiments, the layout constraining rules 26 correspond to linear equality and inequality objectives and constraints.

Each of the layout constraining rules 254 may be associated with a respective strength label that is used by the marketing item creation module 82 to prioritize constraints when all of the constraints cannot be satisfied in a given layout of implicit logical blocks. The strength labels are selected from a predefined strength hierarchy that compasses strength labels for required constraints and non-required constraints. In one exemplary implementation, the strength hierarchy consists of the following strength labels in order of priority: required, strong, and weak. Rules that are associated with a "required" strength label are referred to herein as "required rules" and rules that are associated with "strong" or "weak" strength labels are referred to herein as "non-required rules".

The marketing item creation module 82 determines the values of the variables represented by the symbolic expressions in the adaptive layout template 250 by solving the layout constraints 254 for a specified set of contents 252 that are assigned to the implicit logical blocks. The marketing item creation module 82 may solve the constraints 254 using any one of a wide variety of different constraint solving methods, including a simplex-based linear constraint solving method.

The marketing item creation module 82 then generates the output electronic specifications based on the adaptive layout template 250, the determined symbolic expression values, and the specified contents 252. In this process, the marketing item creation module 82 populates the symbolic expressions in the adaptive layout template 250 with the determined variable values and calculates the results of symbolic expressions corresponding to mathematical equations. The marketing item creation module 82 generates the output electronic specifications 24 by rendering the specified document contents in accordance with the resulting, fully-specified layout template. As shown in FIG. 12, multiple customized output electronic specifications 24 of marketing items may be generated based on the same adaptive layout template 250 simply by changing the contents that are assigned to the implicit logical blocks that were defined by the layout constraining rules 254.

In some embodiments, the layout constraining rules 254 are generated offline based on an existing input electronic document (e.g., a centrally produced marketing item). Additional details regarding the generation of such rules and the output electronic specification generation process shown in FIG. 12 may be obtained from U.S. patent application Ser. No. 11/055,744, which was filed Feb. 10, 2005, by Hui Chao et al., and is entitled "Constraining Layout Variations For Accommodating Variable Content In Electronic Documents," and is incorporated herein by reference.

Figure 13:
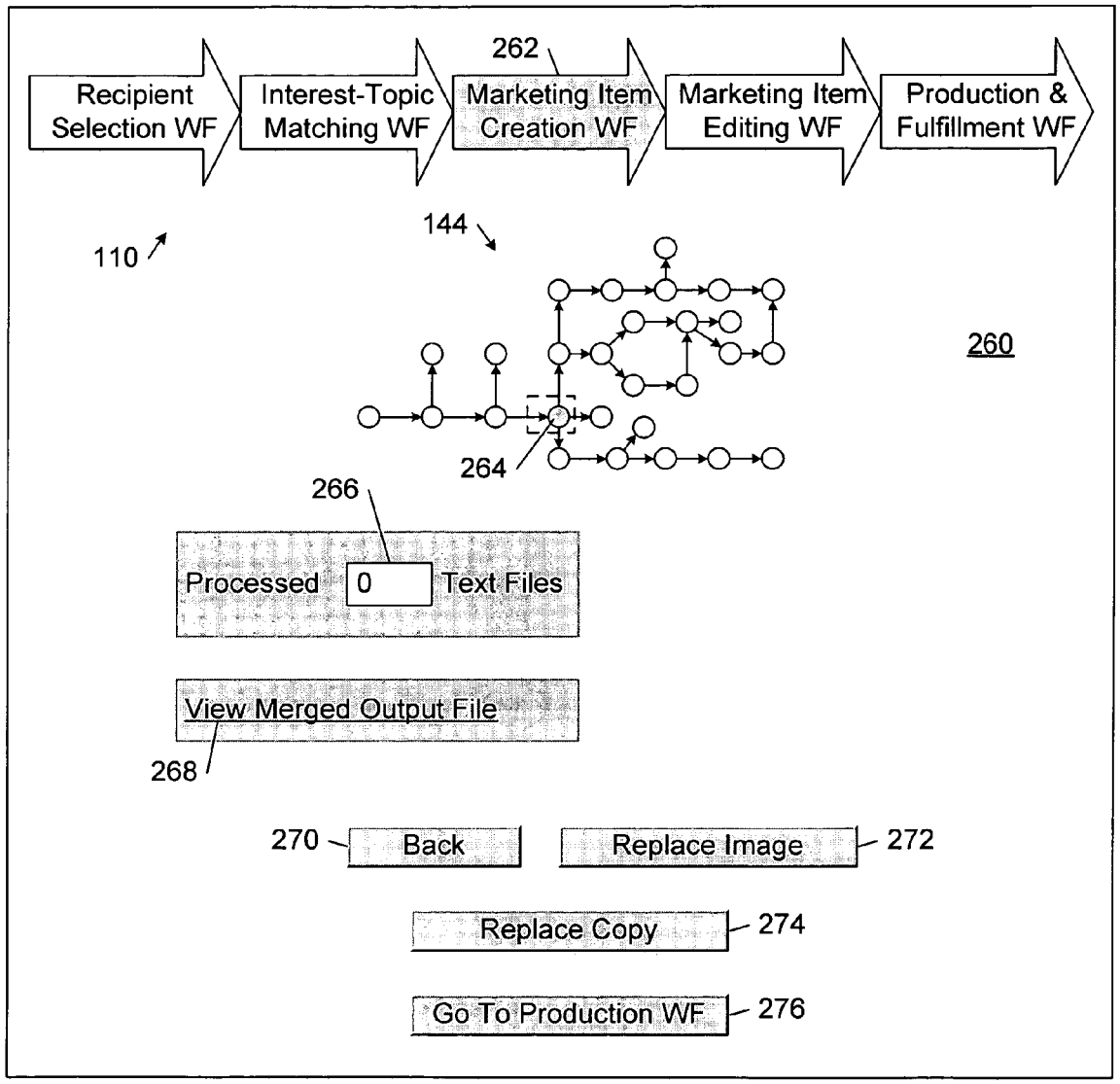
FIG. 13 is a diagrammatic view of an embodiment of a graphical user interface presenting options for modifying a marketing item and initiating a rendering job workflow.

FIG. 13 shows a graphical user interface 260 that is presented to the user 22 after the marketing item creation module 82 has created the output electronic specifications 24 of the marketing items. The graphical user interface 260 highlights the Marketing Item Creation WF arrow 262 in the front-end workflow sequence 110 to indicate that the user 22 is operating in the marketing item creation workflow stage of the process. The graphical user interface 260 also highlights the node 264 to indicate that the campaign management system 12 is in the "generate output electronic specifications" state.

The graphical user interface 260 provides an indication of the number of text files that have been processed in an output text field 266. The user 22 may view the proof output files specified in the graphical user interface 180 shown in FIG. 10 by selecting the "View Merged Output File" command 268, which is linked to a PDF document corresponding to the selected proof output file. The user 22 may return to the graphical user interface 180 by selecting the "Back" command button 270. The user may replace an image or replace copy in the selected proof output file by selecting the "Replace Image" or the "Replace Copy" command buttons 272, 274. The user 22 may prepare the generated output electronic specifications for transmission to the rendering platform 20 by selecting the "Go To Production WF" command button 276.

G. Marketing Item Editing Workflow

Figure 14:
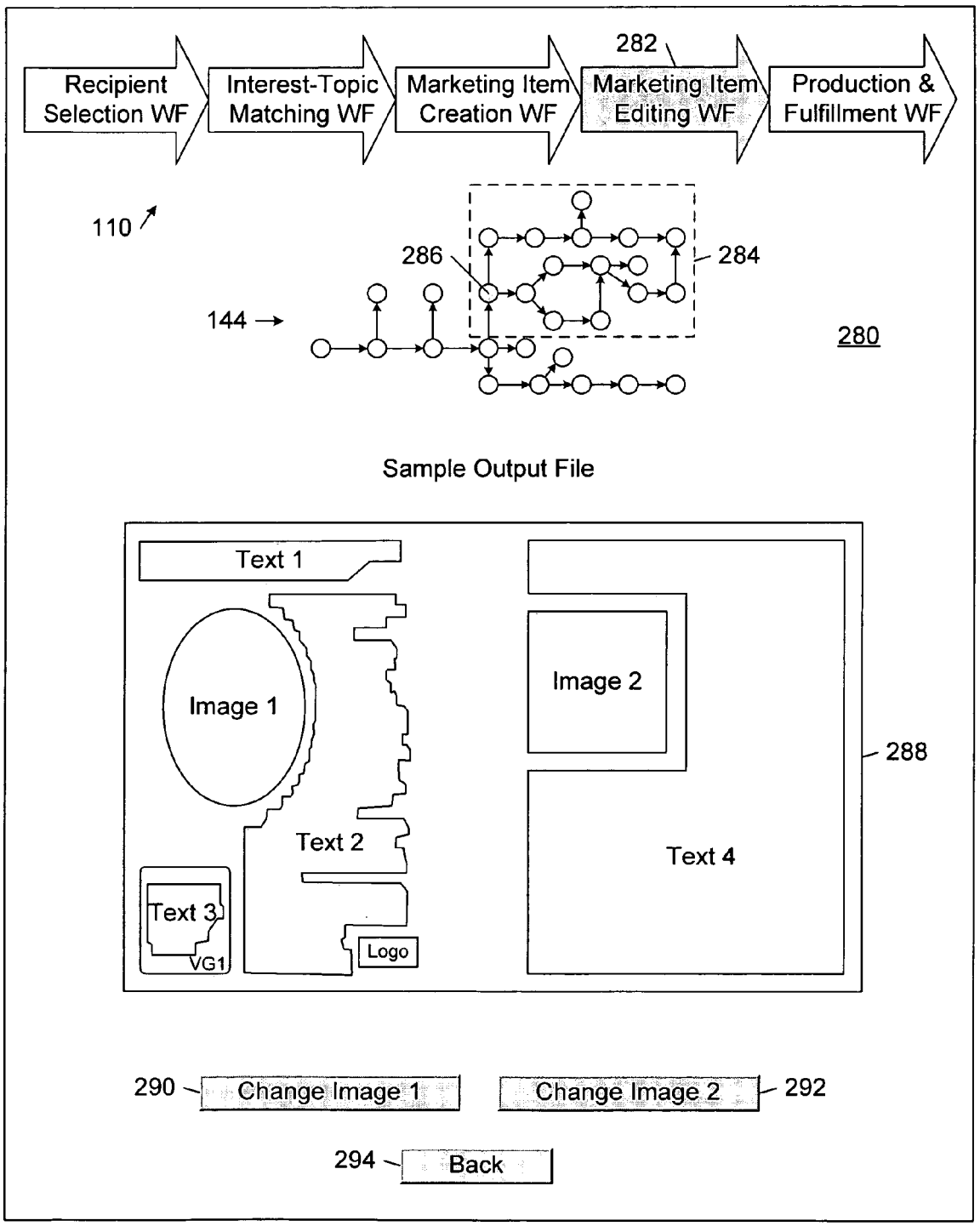
FIG. 14 is a diagrammatic view of an embodiment of a graphical user interface showing a sample marketing item output file and presenting options for modifying the output file.

FIG. 14 shows a graphical user interface 280 that is presented to the user 22 after the user has selected the "Replace Image" command 272 in the graphical user interface 260 (FIG. 13). The graphical user interface 280 highlights the Marketing Item Editing WF arrow 282 in the front-end workflow sequence 110 to indicate that the user 22 is operating in the marketing item editing workflow stage of the process. The graphical user interface 280 indicates that the current marketing item editing stage includes the campaign management system states that are enclosed within the dashed box 284. The graphical user interface 280 also highlights the node 286 to indicate that the campaign management system 12 currently is in the "view sample PDF" state.

The graphical user interface 280 presents a PDF image 288 corresponding to the selected proof (or sample) output file. The exemplary sample output file shown in FIG. 14 includes two variable image logical blocks (i.e., Image 1 and Image 2), four variable text logical blocks (i.e., Text 1, Text 2, Text 3, and Text 4), and two static images (i.e., a vector graphic image VG1 and a Logo image). The user 22 may change Image 1 and Image 2 by selecting the "Change Image 1" and the "Change Image 2" command buttons 290, 292, respectively. The user 22 may return to the graphical user interface 260 shown in FIG. 13 by selecting the "Back" command button 294.

Figure 15:
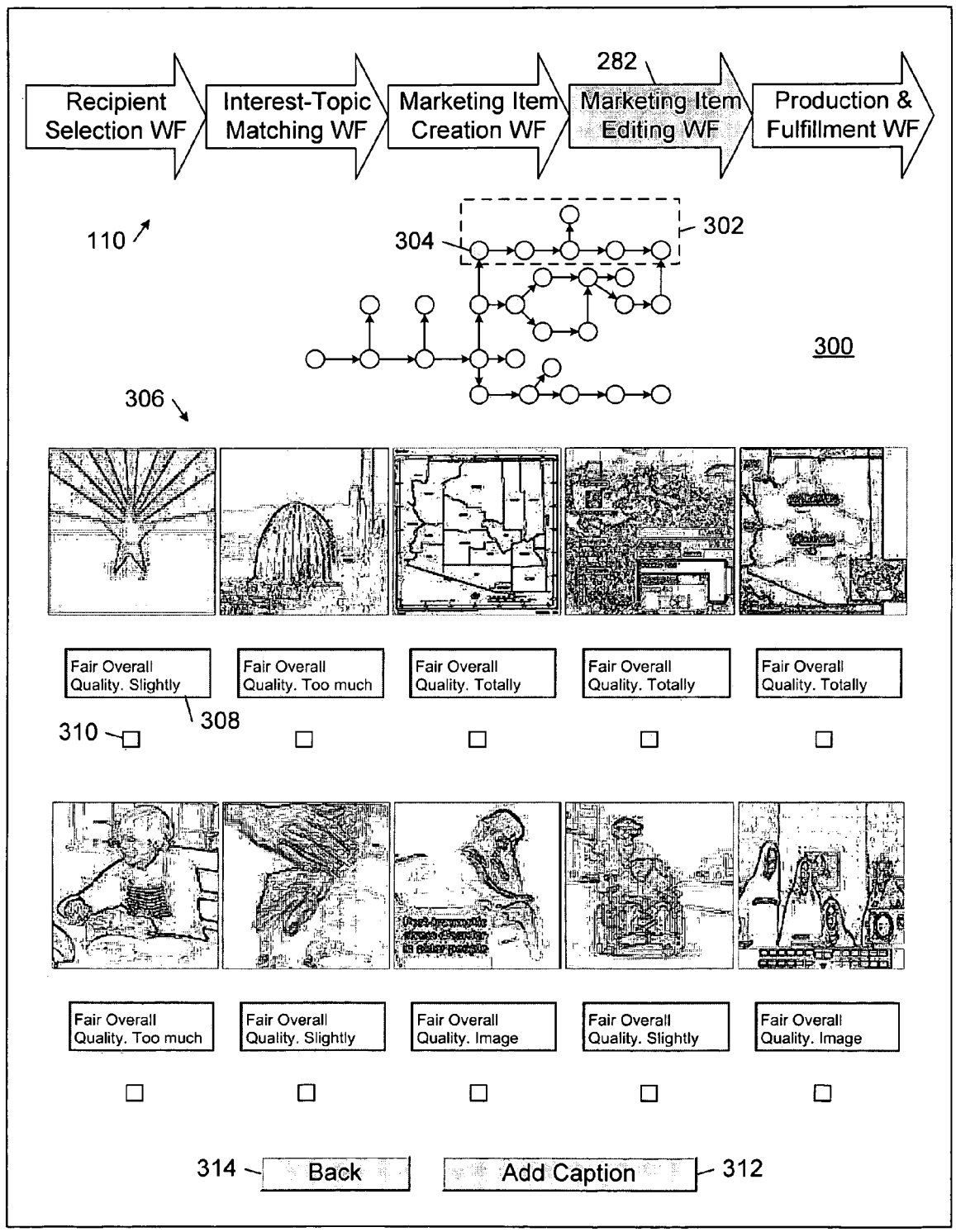
FIG. 15 is a diagrammatic view of an embodiment of a graphical user interface showing a set of potential replacement images for image 2 shown in FIG. 14.

FIG. 15 shows a graphical user interface 300 that is presented to the user 22 after the user has selected the "Change Image 2" command 292 in the graphical user interface 280 (FIG. 14). The graphical user interface 300 highlights the Marketing Item Editing WF arrow 282 in the front-end workflow sequence 110 to indicate that the user 22 still is operating in the marketing item editing workflow stage of the process. The graphical user interface 300 indicates that the current marketing item editing stage includes the campaign management system states that are enclosed within the dashed box 302. The graphical user interface 300 also highlights the node 304 to indicate that the campaign management system 12 currently is in the "view image repository/select image" state.

The graphical user interface 300 displays images 306 from the contents database 16 that may be used to replace Image 2 in the sample output file 288 shown in FIG. 14. These images 306 were matched by the interest-topic matching module 76 to the recipient segment corresponding to the sample output file 288. For each image 306, the graphical user interface 300 displays a respective text box 308 containing a description of the quality of the associated image. In the example shown in FIG. 15, each text box 308 contains an overall assessment of image quality (i.e., "fair overall quality," "good overall quality," and "best overall quality"), an assessment of the focal quality of the image (e.g., "totally out of focus", "too much out of focus," "slightly out of focus", "image has good focus"), and an assessment of the lighting quality of the image (e.g., "the image is poorly lit," "the image is well lit" and "very bright image"). These assessments may be made offline using any one of a wide variety of different image quality assessment processes.

The user 22 may select the image to replace Image 2 by selecting the checkbox 310 associated with the replacement image. The user 22 may add a caption to the selected image by selecting the "Add Caption" command button 312. The user 22 may return to the graphical user interface 280 shown in FIG. 14 by selecting the "Back" command button 314.

Figure 16:
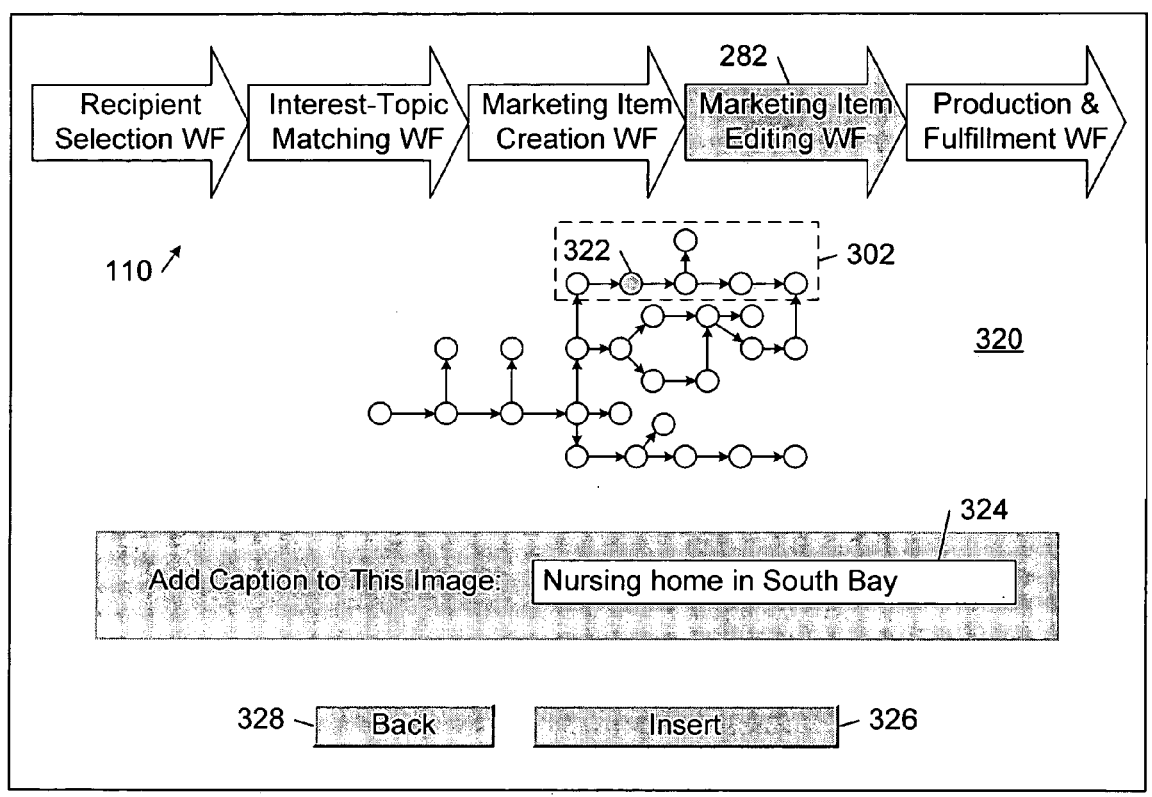
FIG. 16 is a diagrammatic view of an embodiment of a graphical user interface prompting a user to add a caption to a selected one of the images shown in FIG. 15.

FIG. 16 shows a graphical user interface 320 that is presented to the user 22 after the user has selected the "Add Caption" command button 312 in the graphical user interface 300 (FIG. 15). The graphical user interface 320 highlights the Marketing Item Editing WF arrow 282 in the front-end workflow sequence 110 to indicate that the user 22 still is operating in the marketing item editing workflow stage of the process. The graphical user interface 320 also highlights the node 322 to indicate that the campaign management system 12 currently is in the "add caption" state.

The graphical user interface 320 prompts the user 22 to enter a caption for the selected one of the images 306 in an "Add Caption to This Image" text input field 324. The user 22 may trigger the marketing item editing module 84 to associate the entered caption (e.g., "Nursing home in South Bay") with the selected one of the images 306 by selecting the "Insert" command button 326. The user 22 may return to the graphical user interface 280 shown in FIG. 14 by selecting the "Back" command button 328.

Figure 17:
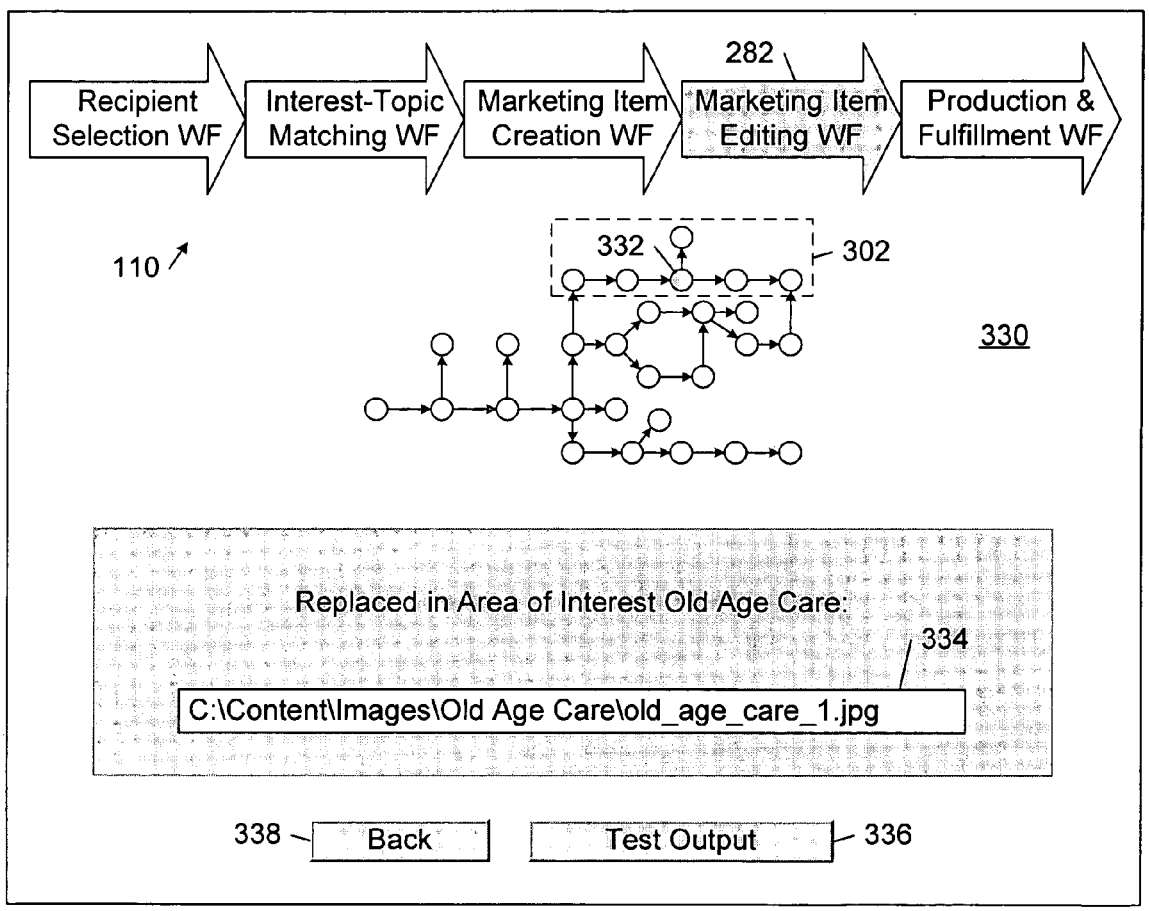
FIG. 17 is a diagrammatic view of an embodiment of a graphical user interface indicating that a selected one of the images shown in FIG. 15 will be associated with a specified recipient interest.

FIG. 17 shows a graphical user interface 330 that is presented to the user 22 after the user has selected the "Insert" command button 326 in the graphical user interface 320 (FIG. 16). The graphical user interface 330 highlights the Marketing Item Editing WF arrow 282 in the front-end workflow sequence 110 to indicate that the user 22 still is operating in the marketing item editing workflow stage of the process. The graphical user interface 330 also highlights the node 332 to indicate that the campaign management system 12 currently is in the "remind the user to select an interest group" state.

The graphical user interface 330 prompts the user 22 to select a recipient interest group that will be associated with the selected one of the images 306 by entering a file location corresponding to the interest group in a text input field 334. In some implementations, the text input field 334 will contain the file location corresponding to the campaign topic (e.g., Old Age Care) that is associated with the sample output file being modified. The user 22 may view the appearance of selected image in the sample output file by selecting the "Test Output" command button 336. In response to the selection of this button 336, the marketing item editing module 84 triggers the marketing item creation module 82 to regenerate the sample output file with the new image and display the resulting sample output file in the graphical user interface 280 shown in FIG. 14. The user 22 may return to the graphical user interface 260 shown in FIG. 13 by selecting the "Back" command button 338.

Figure 18:
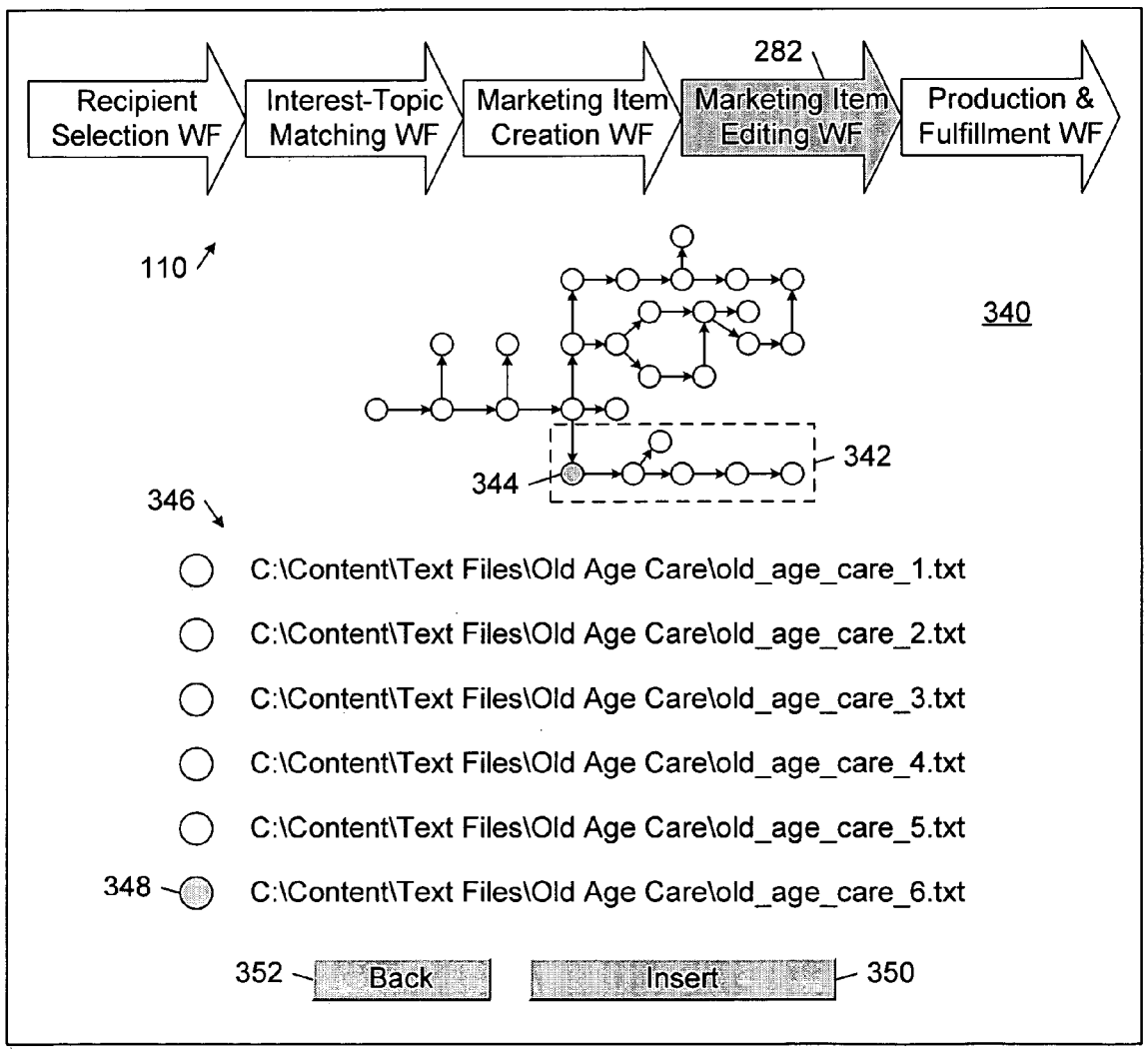
FIG. 18 is a diagrammatic view of an embodiment of a graphical user interface presenting a list of text files in a contents repository.

FIG. 18 shows a graphical user interface 340 that is presented to the user 22 after the user has selected the "Replace Copy" command 274 in the graphical user interface 260 (FIG. 13). The graphical user interface 340 highlights the Marketing Item Editing WF arrow 282 in the front-end workflow sequence 110 to indicate that the user 22 is operating in the marketing item editing workflow stage of the process. The graphical user interface 280 indicates that the current marketing item editing stage includes the campaign management system states that are enclosed within the dashed box 342. The graphical user interface 340 also highlights the node 344 to indicate that the campaign management system 12 currently is in the "view list of text files" state.

The graphical user interface 340 displays a list 346 of text files from the contents database 16 that may be used to replace one of more text logical blocks in the sample output file 288 shown in FIG. 14. These text files were matched by the interest-topic matching module 76 to the recipient segment corresponding to the sample output file 288. The user 22 may select the text file to replace a selected one of the text files in the sample output file by selecting the radio button 348 associated with the replacement text file. The user 22 may insert the selected text file in the sample output file by selecting the "Insert" command button 350. The user 22 may return to the graphical user interface 280 shown in FIG. 14 by selecting the "Back" command button 352.

Figure 19:
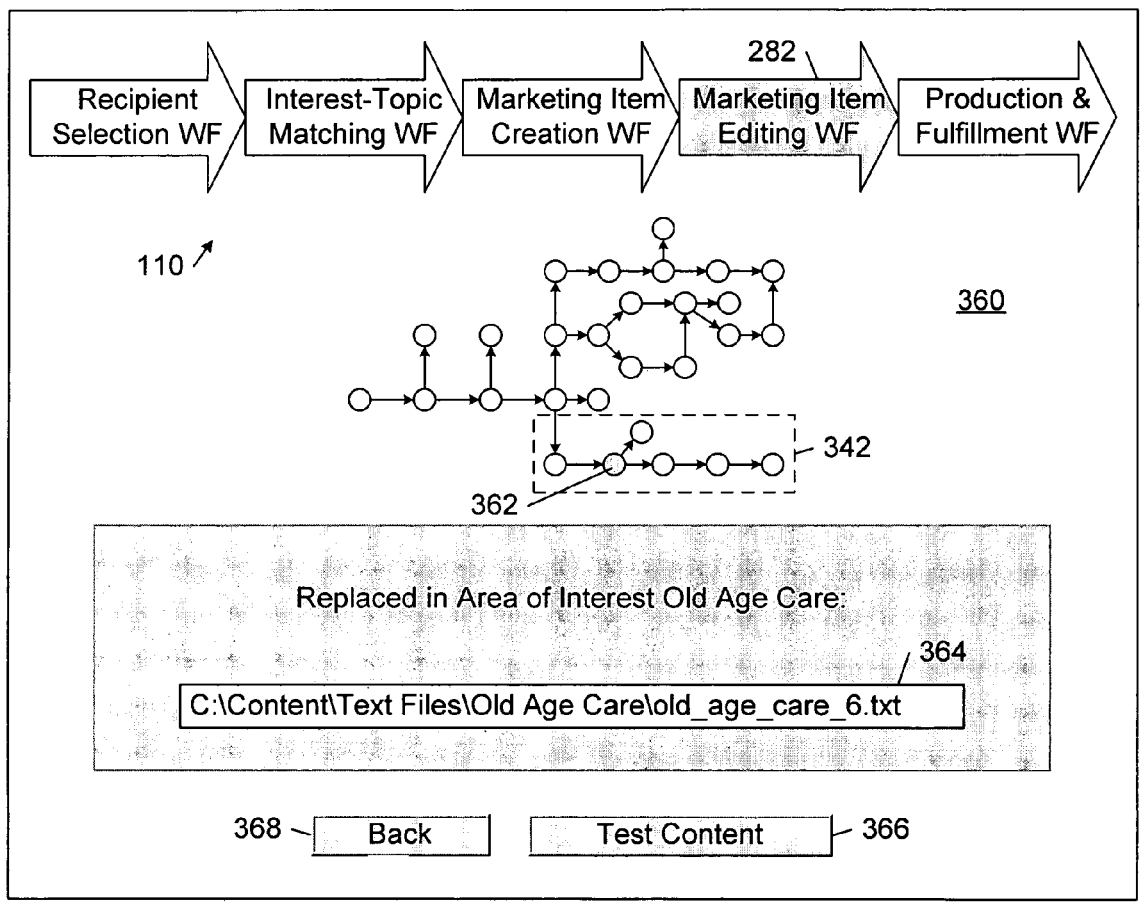
FIG. 19 is a diagrammatic view of an embodiment of a graphical user interface indicating that a selected one of the text files shown in FIG. 19 will be associated with a specified recipient interest.

FIG. 19 shows a graphical user interface 360 that is presented to the user 22 after the user has selected the "Insert" command button 350 in the graphical user interface 340 (FIG. 18). The graphical user interface 360 highlights the Marketing Item Editing WF arrow 282 in the front-end workflow sequence 110 to indicate that the user 22 still is operating in the marketing item editing workflow stage of the process. The graphical user interface 360 also highlights the node 362 to indicate that the campaign management system 12 currently is in the "remind the user to select an interest group" state.

The graphical user interface 360 prompts the user 22 to select a recipient interest group that will be associated with the selected one of the text files in the list 346 by entering a file location corresponding to the interest group in a text input field 364. In some implementations, the text input field 364 will contain the file location corresponding to the campaign topic (e.g., Old Age Care) that is associated with the sample output file being modified. The user 22 may view the appearance of selected image in the sample output file by selecting the "Test Output" command button 366. In response to the selection of this button 366, the marketing item editing module 84 triggers the marketing item creation module 82 to regenerate the sample output file with the new textual content and display the resulting sample output file in the graphical user interface 280 shown in FIG. 14. The user 22 may return to the graphical user interface 260 shown in FIG. 13 by selecting the "Back" command button 368.

Figure 20:
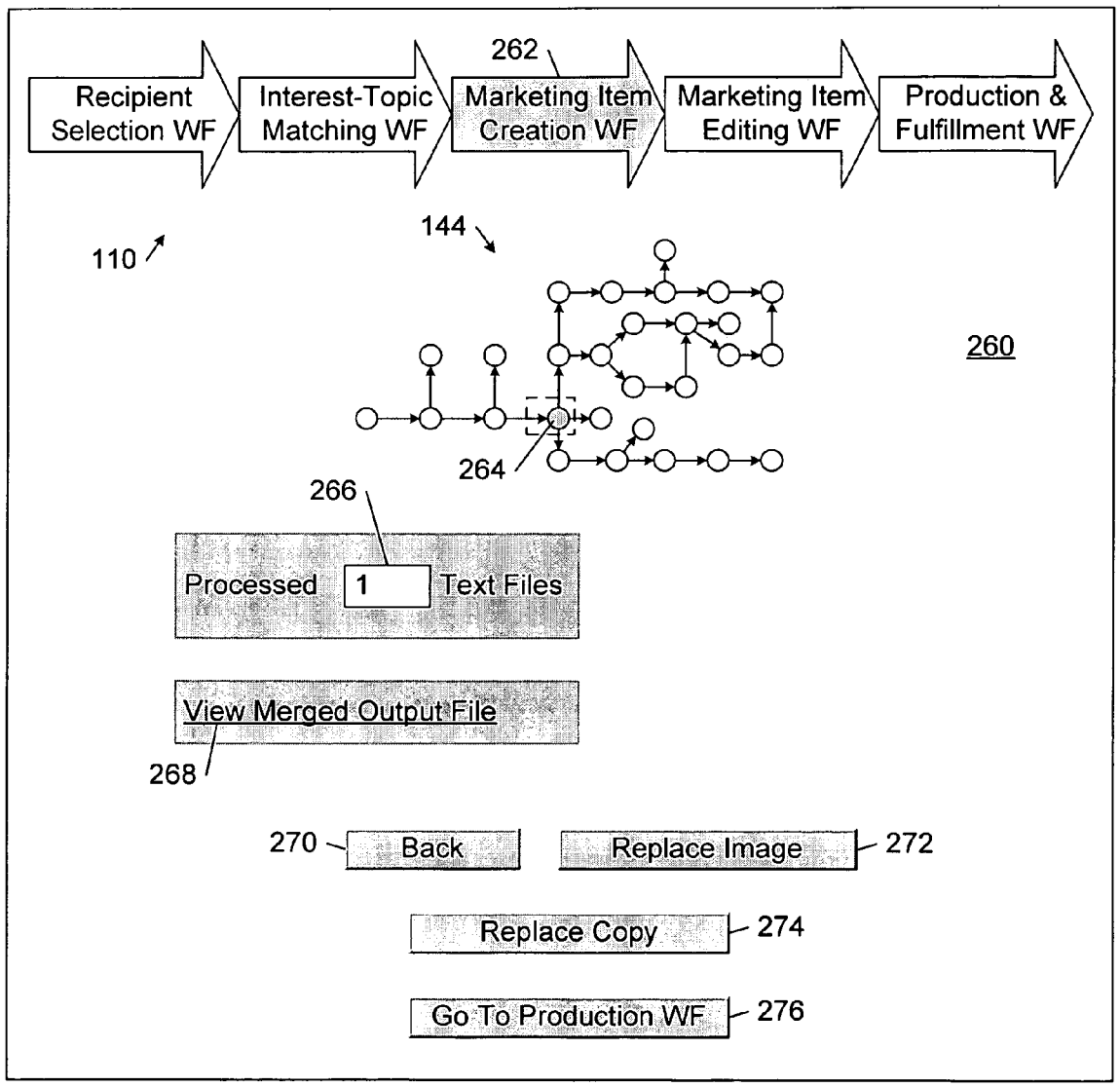
FIG. 20 is a diagrammatic view of an embodiment of a graphical user interface presenting options for modifying a marketing item and initiating a rendering job workflow.

Referring to FIG. 20, after the user 22 has completed all of the modifications to the sample output file, the user 22 returns to the graphical user interface 260. In the illustrated example, the graphical user interface 260 shows in the output text field 266 that one text file has been processed. At this point the user 22 may prepare the generated output electronic specifications for transmission to the rendering platform 20 by selecting the "Go To Production WF" command button 276.

H. Production and Fulfillment Workflow

Figures 21, 22:
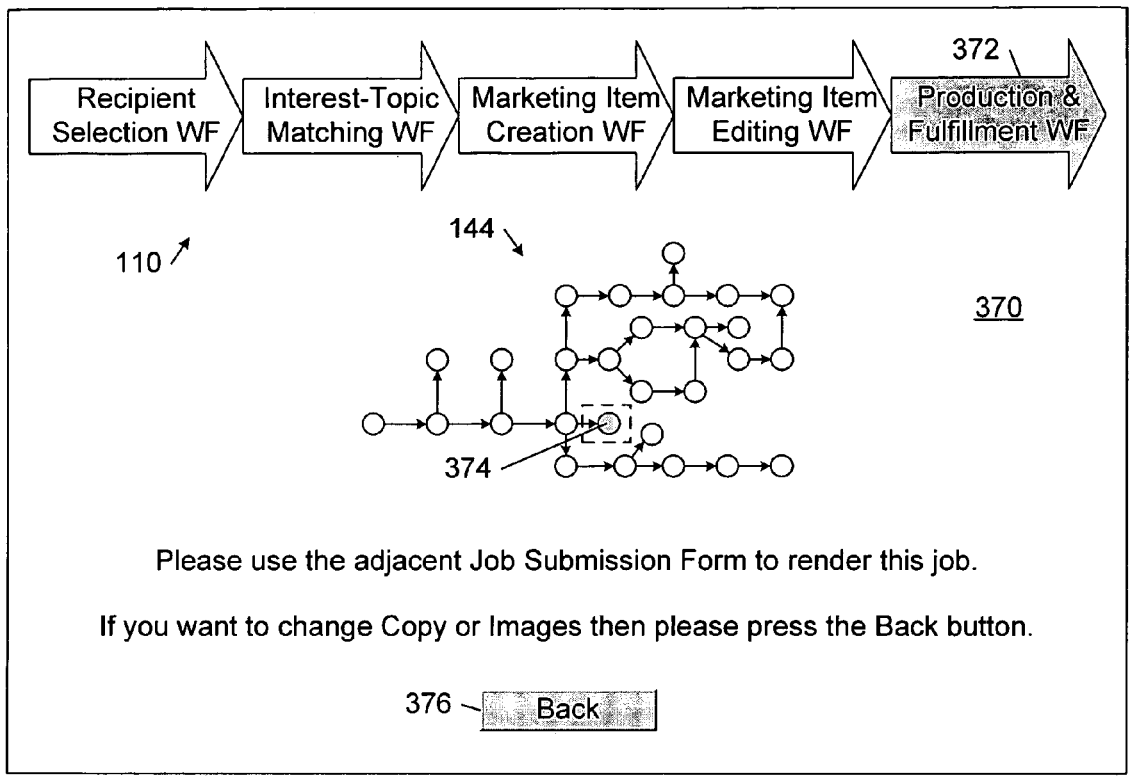
FIG. 21 is a diagrammatic view of an embodiment of a graphical user interface prompting a user to complete a rendering job submission form.
FIG. 22 is a diagrammatic view of an embodiment of a graphical user interface presenting a rendering job submission form and an option for transmitting the rendering job submission form to a rendering platform.

FIG. 21 shows a graphical user interface 370 that is presented to the user 22 after the marketing item creation module 82 has created the output electronic specifications 24 of the marketing items and the user 22 has completed any modifications to the output electronic specifications 24. The graphical user interface 370 highlights the Production and Fulfillment WF arrow 372 in the front-end workflow sequence 110 to indicate that the user 22 is operating in the production and fulfillment workflow stage of the process. The graphical user interface 370 also highlights the node 374 to indicate that the campaign management system 12 is in the "send output to production workflow" state.

The graphical user interface 370 provides an indication that the user should complete the adjacent Rendering Job Submission Form in order to render the marketing item production job. The user 22 may return to the graphical user interface 260 by selecting the "Back" command button 376.

FIG. 22 shows a graphical user interface 380 that presents the form fields for a Rendering Job Submission Form. To complete the form, the user 22 enters information about the marketing item production job and about the user submitting the job. In particular, the user 22 enters the name of the file containing the output electronic specifications 24 of the marketing items in a Rendering Job File text input field 382. The user 22 enters the location (or URL) of the rendering platform 20 in a Rendering Location text input field 384. The user 22 enters the name of the rendering platform 20 in a Rendering System text input field 386. The user 22 enters his or her name in a Name text input field 388 and enters his or her electronic mail (email) address in an Email text input field 390. After the user has completed the Rendering Job Submission Form, the user 22 may select the Submit command button to submit the marketing item production job to the production and fulfillment module 86 for processing.

The production and fulfillment module 86 takes the output electronic specifications that are created by the marketing item creation module 82 and performs preflight, proofing, and color management. During preflighting, the production and fulfillment module 86 checks the specified output file and makes sure that all the elements are correct and within the specifications of the rendering platform 20. In some implementations, the production and fulfillment module 86 determines whether there are any missing font files or image or graphic files.

The output electronic specifications may be modified during the preflight, proofing, and color management processes. After these processes have been completed, the production and fulfillment module 86 sends the rendering platform 20 a rasterized image format file corresponding to the modified output electronic specifications 24.

In some embodiments, the production and fulfillment module 86 generates proofs of the composed marketing items corresponding to the color gamut and image resolution capabilities of the rendering platform 20. The user 22 may view the proofs of the marketing items before the production and fulfillment module 86 generates the final output.

In some embodiments, a job status monitoring system gives the user an indication of the status of the current stage of the processing job.

I. Backend Workflows

Referring back to FIG. 5, the response analysis workflow 98 is used to analyze responses received from the recipients of the marketing materials that are produced by the campaign management system 12 for the marketing campaign. The response design workflow 102 is used to select content for follow-up marketing solicitations that are personalized and custom-tailored to the respondents of the marketing campaign. The database update workflow 104 is used to update the recipients database 14 with new information contained in the responses to the marketing campaign that are received from the targeted recipients.

The content upload workflow 100 is used to upload images and copy into the contents database 16. The content upload workflow 100 helps the user to easily load content and create the new contents that are targeted to a specific group of intended recipients. During this workflow, the user 22 may upload images into the contents database 16 and edit textual content in the contents database 16. The campaign management system 12 checks and scores the quality of the uploaded images. Thumbnails of all the images in the contents database 16 are displayed for the user's review and selection. The campaign management system 12 also is connected to the marketing item editing module 84, which allows the user 22 to branch to the content upload workflow 100 to upload new images and replace existing textual content for certain groups of recipients.

In some implementations, the campaign management system 12 incorporates photo layout technology that allows the user 22 to compose new images from a number of constituent images selected from the contents database 16. The implementations may incorporate one or more of the layout systems and methods described in one or more of the following co-pending applications, each of which is incorporated herein by reference: U.S. patent application Ser. No. 10/675,724, filed Sep. 30, 2004, by C. Brian Atkins and entitled "Automatic Photo Album Layout"; U.S. patent application Ser. No. 10/675,823, filed Sep. 30, 2004, by C. Brian Atkins and entitled "Single Pass Automatic Photo Album Layout"; U.S. patent application Ser. No. 11/127,326, filed May 12, 2005, by C. Brian Atkins and entitled "Method for Arranging Graphic Assemblies"; U.S. patent application Ser. No. 11/126,637, filed Apr. 15, 2005, by Xiaofan Lin et al. and entitled "Automatic Layout Generation for Documents Containing Text"; and U.S. patent application Ser. No. 11/151,167, filed Jun. 10, 2005, by C. Brian Atkins et al. and entitled "Constraint-Based Albuming Of Graphic Elements".

IV. Conclusion

The embodiments that are described in detail above provide an integrated marketing campaign production approach that allows persons who are not experts in marketing or graphic design to execute a marketing campaign, including the production of high-quality marketing communications, in a way that is less expensive and resource-intensive than current high-end marketing approaches. These embodiments may be used in-house by business entities seeking to produce high-end direct marketing communications for their own products or services and by third party service providers offering such production services to other business entities.

Other embodiments are within the scope of the claims.

What is claimed is:

1. A machine-implemented method of producing marketing items for a marketing campaign, comprising:
  on a display, prompting a user to specify campaign parameters defining a scope of the campaign, wherein the campaign parameters comprise one or more campaign topics each of which corresponds to a respective subject matter that is being promoted by the marketing campaign;
  on the display, prompting the user to specify for each of the one or more campaign topics a respective set of one or more attributes of intended recipients of the marketing campaign;
  associating the one or more specified campaign topics to respective sets of targeted recipients selected from a database of records of potential recipients based on mappings of the respective sets of recipient attributes to the campaign topics and the specified campaign parameters defining the scope of the marketing campaign; and for each of the targeted recipients, composing a respective marketing item containing a respective set of one or more contents matched to the campaign topic associated to the targeted recipient.

2. The method of claim 1, wherein the prompting of the user to specify campaign parameters comprises prompting the user to specify an optimization objective of the campaign.

3. The method of claim 2, wherein the prompting of the user to specify campaign parameters comprises prompting the user to specify an optimization objective selected from maximize total dollar return, maximize net dollar return, and maximize recipient response rate.

4. The method of claim 2, wherein the associating comprises selecting from the potential recipients records database the sets of targeted recipients that satisfy the specified optimization objective.

5. The method of claim 1, wherein the prompting of the user to specify campaign parameters comprises prompting the user to specify a maximum budget for the campaign.

6. The method of claim 1, wherein the prompting of the user to specify campaign parameters comprises prompting the user to specify a maximum number of marketing items to be produced.

7. The method of claim 1, wherein the prompting of the user to specify recipient attributes comprises prompting the user to specify a minimal measure of past recipient responsiveness to marketing solicitations.

8. The method of claim 7, wherein the prompting of the user to specify recipient attributes comprises prompting the user to specify a minimal measure of recency of past recipient response to marketing solicitations.

9. The method of claim 7, wherein the prompting of the user to specify recipient attributes comprises prompting the user to specify a minimal measure of frequency of past recipient response to marketing solicitations.

10. The method of claim 7, wherein the prompting of the user to specify recipient attributes comprises prompting the user to specify a minimal measure of past recipient monetary response to marketing solicitations.

11. The method of claim 1, wherein the prompting of the user to specify recipient attributes comprises prompting the user to specify one or more demographic attributes of the intended recipients of the marketing campaign.

12. The method of claim 1, wherein the associating comprises matching potential interest labels contained in the potential recipients records to the one or more campaign topics.

13. The method of claim 1, further comprising presenting one or more summaries of predicted outcomes of the marketing campaign.

14. The method of claim 13, wherein the presenting comprises presenting one or more measures of predicted financial outcomes of the campaign.

15. The method of claim 14, wherein the presenting comprises presenting one or more of a predicted cost of the marketing campaign, a predicted total dollar return for the marketing campaign, and a predicted net dollar return for the marketing campaign.

16. The method of claim 13, wherein the presenting comprises presenting a predicted recipient response rate for the marketing campaign.

17. The method of claim 13, wherein the presenting comprises presenting a chart summarizing one or more predicted outcomes of the marketing campaign.

18. The method of claim 1, further comprising presenting one or more statistics summarizing respective aspects of the sets of targeted recipients.

19. The method of claim 18, wherein the presenting comprises presenting a total number of recipients in each set of targeted recipients.

20. The method of claim 18, wherein the presenting comprises presenting an indication of a total number of recipients in each set of targeted recipients associated with potential interest labels contained in the corresponding ones of the potential recipient records.

21. The method of claim 1, wherein the composing comprises matching to each of the one or more campaign topics a respective set of one or more contents in a database of potential contents.

22. The method of claim 21, wherein the matching comprises comparing meta data associated with ones of the contents in the potential contents database to the one or more campaign topics.

23. The method of claim 1, wherein the composing comprises laying out the respective set of one or more contents in a selected base template for each of the marketing items.

24. The method of claim 23, wherein the base template is an adaptive template and the composing comprises dynamically adjusting logical blocks in the adaptive template to accommodate the respective set of one or more contents.

25. The method of claim 1, wherein the composing comprises laying out the respective set of one or more contents in a respective template that is generated dynamically for each of the marketing items.

26. The method of claim 1, further comprising prompting the user to specify one or more parameters identifying ones of the composed marketing items, and presenting graphical representations of the identified ones of the composed marketing items.

27. The method of claim 1, further comprising providing the user an option to replace one or more of the contents in a presented one of the composed marketing items.

28. The method of claim 27, wherein the providing comprises presenting one or more potential replacement contents to the user.

29. The method of claim 28, wherein the providing comprises prompting the user to enter a caption to associate with a selected one of the replacement contents.

30. The method of claim 28, wherein the providing additionally comprises prompting the user to associate a selected one of the replacement contents to one or more potential interest labels contained in the potential recipient records.

31. The method of claim 28, wherein the providing additionally comprises uploading one or more user-selected content into a database of potential contents.

32. The method of claim 31, wherein the uploading comprises processing image-based contents to improve image quality.

33. The method of claim 31, wherein the uploading comprises associating descriptions of image quality to image-based contents.

34. The method of claim 28, wherein the providing comprises automatically composing a composite image-based content from a set of constituent images selected by the user.

35. The method of claim 1, further comprising processing ones of the composed marketing items into a format suitable for rendering and storing the processed marketing items in a physical data storage system.

36. The method of claim 35, wherein the processing comprises preflighting the composed marketing items in accordance with rendering specifications of a selected rendering platform.

37. The method of claim 35, wherein the processing comprises generating proofs of the composed marketing items corresponding to the color gamut and image resolution capabilities of a selected rendering platform.

38. The method of claim 1, further comprising electronically transmitting ones of the composed marketing items to a rendering platform.

39. A system for producing marketing items for a marketing campaign, comprising:
- a computer-readable medium storing computer-readable instructions; and
- a data processing unit coupled to the memory, operable to execute the instructions, and based at least in part on the execution of the instructions operable to perform operations comprising
  - on a display, prompting a user to specify campaign parameters defining a scope of the campaign, wherein the campaign parameters comprise one or more campaign topics each of which corresponds to a respective subject matter that is being promoted by the marketing campaign;
  - on the display, prompting the user to specify for each of the one or more campaign topics a respective set of one or more attributes of intended recipients of the marketing campaign;
  - associating the one or more specified campaign topics to respective sets of targeted recipients selected from a database of records of potential recipients based on mappings of the respective sets of recipient attributes to the campaign topics and the specified campaign parameters defining the scope of the marketing campaign; and
  - for each of the targeted recipients, composing a respective marketing item containing a respective set of one or more contents matched to the campaign topic associated to the targeted recipient.

40. A machine-readable medium storing machine-readable instructions causing a machine to perform operations comprising:
- on a display, prompting a user to specify campaign parameters defining a scope of the campaign, wherein the campaign parameters comprise one or more campaign topics each of which corresponds to a respective subject matter that is being promoted by the marketing campaign;
- on the display, prompting the user to specify for each of the one or more campaign topics a respective set of one or more attributes of intended recipients of the marketing campaign;
- associating the one or more specified campaign topics to respective sets of targeted recipients selected from a database of records of potential recipients based on mappings of the respective sets of recipient attributes to the campaign topics and the specified campaign parameters defining the scope of the marketing campaign; and
- for each of the targeted recipients, composing a respective marketing item containing a respective set of one or more contents matched to the campaign topic associated to the targeted recipient.

* * * * *